United States Patent
Kitani

(10) Patent No.: US 8,284,659 B2
(45) Date of Patent: Oct. 9, 2012

(54) COMMUNICATION APPARATUS, COMMUNICATION METHOD, AND RECORDING MEDIUM STORING PROGRAM

(75) Inventor: Mitsuhiro Kitani, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 144 days.

(21) Appl. No.: 12/414,173

(22) Filed: Mar. 30, 2009

(65) Prior Publication Data
US 2009/0245126 A1    Oct. 1, 2009

(30) Foreign Application Priority Data
Mar. 31, 2008 (JP) .................... 2008-094341

(51) Int. Cl.
*H04L 12/28* (2006.01)
(52) U.S. Cl. ..... 370/230; 370/235; 370/252; 370/310.2; 370/328; 370/349; 370/395.2; 370/395.41; 370/468; 709/232; 455/422.1
(58) Field of Classification Search .......... 370/230, 370/230.1, 231, 235, 252, 310.2, 328, 329–339, 370/349, 395.2, 395.21, 395.41, 468; 709/232–235; 455/422.1
See application file for complete search history.

(56) References Cited

U.S. PATENT DOCUMENTS

| | | | |
|---|---|---|---|
| 2006/0268336 A1 | 11/2006 | Sakaniwa et al. | |
| 2007/0011503 A1 | 1/2007 | Kitani et al. | |
| 2007/0156440 A1* | 7/2007 | Sorisho | 705/1 |
| 2007/0234385 A1* | 10/2007 | Bopardikar et al. | 725/38 |
| 2008/0225708 A1* | 9/2008 | Lange | 370/230 |

FOREIGN PATENT DOCUMENTS

| | | |
|---|---|---|
| JP | 2004-129244 | 4/2004 |
| JP | 2004-356855 | 12/2004 |
| JP | 2005-130150 | 5/2005 |
| JP | 2006-270410 | 10/2006 |

* cited by examiner

*Primary Examiner* — Hoon J Chung
(74) *Attorney, Agent, or Firm* — Cozen O'Connor

(57) ABSTRACT

When a communication apparatus (server device) that includes wireless access means and can send content data by using the wireless access means starts sending content data, it calculates a communication band that remains available for the server device to perform communication, so that any content that has a rate equal to or greater than the remaining communication band may not be publicized open to and may not hence be sent to a client device.

7 Claims, 20 Drawing Sheets

FIG.3

| TOTAL COMMUNICATION BAND (gbps) |
|---|
| $CB_T$ |

FIG.4A

| TOTAL COMMUNICATION BAND (TRANSMISSION LOAD) |
|---|
| 100 |

FIG.4B

| # | KIND | IMAGE QUALITY | CODEC | TRANSMISSION LOAD |
|---|---|---|---|---|
| 1 | Video | Full HD | MPEG2 | 32 |
| 2 | Video | HD | MPEG2 | 16 |
| 3 | Video | SD | MPEG2 | 4 |
| 4 | Video | Full HD | H.264 | 16 |
| 5 | Video | HD | H.264 | 8 |
| 6 | Video | SD | H.264 | 2 |
| 7 | Video | QVGA | H.264 | 1 |

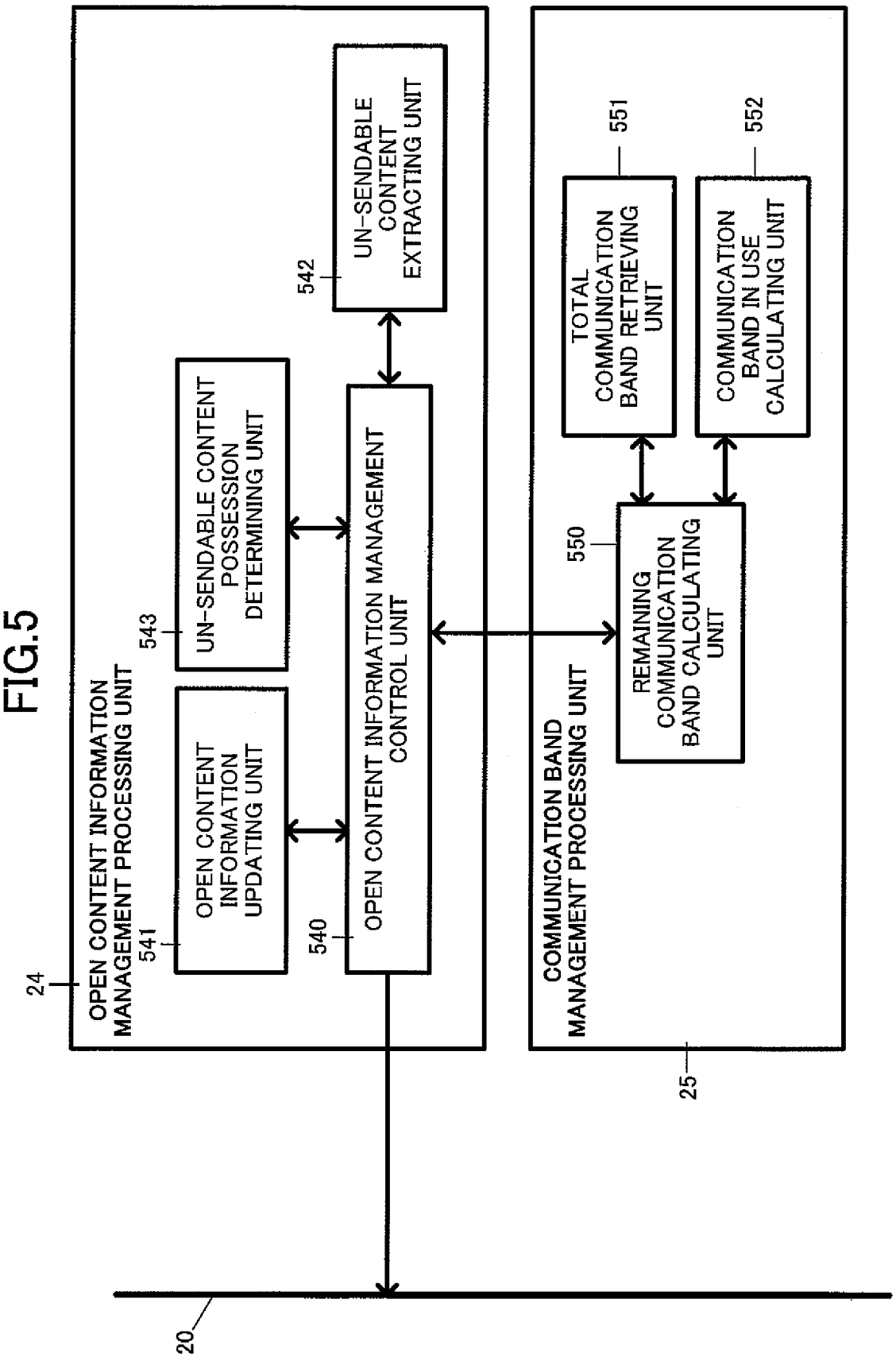

FIG.16A

| # | WIRELESS ACCESS MEANS | TOTAL COMMUNICATION BAND (gbps) |
|---|---|---|
| 1 | FIRST COMMUNICATION SCHEME | $CB1_T$ |
| 2 | SECOND COMMUNICATION SCHEME | $CB2_T$ |

FIG.16B

| # | WIRELESS ACCESS MEANS | TOTAL COMMUNICATION BAND (TRANSMISSION LOAD) |
|---|---|---|
| 1 | FIRST COMMUNICATION SCHEME | 20 |
| 2 | SECOND COMMUNICATION SCHEME | 100 |

FIG.17

| # | COMMUNICATION APPLICATION | ACCESS MEANS TO BE USED | |
|---|---|---|---|
| | | PRIORITY 1 | PRIORITY 2 |
| 1 | CONTENT EXCHANGE | SECOND COMMUNICATION SCHEME | FIRST COMMUNICATION SCHEME |
| 2 | WEB BROWSER | SECOND COMMUNICATION SCHEME | FIRST COMMUNICATION SCHEME |
| 3 | E-MAIL | FIRST COMMUNICATION SCHEME | — |

COMMUNICATION APPARATUS, COMMUNICATION METHOD, AND RECORDING MEDIUM STORING PROGRAM

BACKGROUND OF THE INVENTION

1. Field of the Invention

The present invention relates to a communication apparatus and communication method for transmitting a content, and a recording medium storing a program.

2. Description of the Related Art

With the spread of network data communications over the Internet, a Local Area Network (LAN), etc., many households connect their electric appliances, computers, and other peripheral devices installed in their home to a network to use a home network that allows the devices to communicate.

For example, the Digital Living Network Alliance (DLNA) advocates a seamless network system that provides interoperability among any variety of electric appliances to enable one to enjoy a content from any of the appliances easily and conveniently at any place in the home. This system allows information such as an Audio Visual (AV) content that is stored on any device on the network to be received from any of the devices on the network. Accordingly, there is no need of caring about where a content is stored, and it is possible to view or listen to a content stored on a device that is installed in a separate room while staying in a different room. Therefore, usefulness is increased.

Further, as an extended version of the DLNA, a system that enables a domestic DLNA environment to be used un-domestically is also being studied. According to this technique, a plurality of devices are connected via the Internet according to a Session Initiation Protocol (SIP), and a router that functions as gateware that intermediates between the DLNA and the SIP is installed in the home. Hence, once the router in the home is authenticated successfully, it becomes a virtual DLNA device, which can be controlled by the real DLNA device in a remote place.

As more devices become DLNA-enabled and networking-enabled in the future, it is presumed that plural pieces of communication data may jam the network. In particular, in a case where many unidentified users access home-equipped DLNA devices from outside to send or receive a content, plural pieces of communication data compete for and thus run short of the communication band, and cause problems such as a delay in the distribution of streaming data that allows no delay.

As a method for solving such a problem, Unexamined Japanese Patent Application KOKAI Publication No. 2005-130150 discloses a method that allocates more resources to priority data to improve the communication quality of the priority data based on a priority Quality of Service (QoS) technique. The DLNA guideline also provides wired LAN 802.1D, which is a QoS scheme based on band reservation, and wireless LAN Wi-Fi Multimedia (WMM) as options to propose a system that can prevent a collapse of streaming data distribution that might occur due to a lack of the communication band.

Even the method described in Unexamined Japanese Patent Application KOKAI Publication No. 2005-130150 may be neither able to guarantee the communication quality nor hence able to maintain a fine communication environment when a plurality of streaming distribution sessions are held in parallel. For example, in a case where a plurality of ("n" number of) contents that are set to the same priority degree are streaming-distributed in parallel, if there is no sufficient network band available for transmitting the "n" sequences of streaming data, none of the "n" sequences of streaming data can be maintained at a transfer rate sufficient for them to be reproduced on the client side in real time, causing communication failures on the client device, such as disorders in the reproduced images, sound interruptions, etc.

SUMMARY OF THE INVENTION

One aspect of the present invention is a communication apparatus that sends content data to another communication apparatus via a network, and includes:

a content candidate information storage unit that retains content candidate information that specifies content data candidates that may be sent by the communication apparatus to another communication apparatus;

a remaining communication band information obtaining unit that obtains remaining communication band information that indicates a communication band, of a total communication band available for use by the communication apparatus, that can be used at a time concerned;

a content sending unit that sends any content data specified in the content candidate information to another communication apparatus; and a communication control unit that controls sending of content data by the content sending unit, based on the content candidate information retained by the content candidate information storage unit and the remaining communication band information obtained by the remaining communication band information obtaining unit.

Another aspect of the present invention is a communication method that includes:

storing content candidate information that specifies content data candidates that may be sent to another communication apparatus;

obtaining a remaining communication band that indicates a communication band, of a total communication band that is available for sending contents, that can be used at a time concerned and controlling sending of content data based on the content candidate information and the remaining communication band.

Another aspect of the present invention is a recording medium that stores a computer-readable program which controls a computer to function, in a communication apparatus that sends content data to another communication apparatus via a network, as:

a content candidate information storage unit that retains content candidate information that specifies content data candidates that may be sent by the communication apparatus to the another communication apparatus;

a remaining communication band information obtaining unit that obtains remaining communication band information that indicates a communication band, of a total communication band available for use by the communication apparatus, that can be used at a time concerned;

a content sending unit that sends any content data specified in the content candidate information to another communication apparatus; and a communication control unit that controls sending of content data by the content sending unit, based on the content candidate information retained by the content candidate information storage unit and the remaining communication band information obtained by the remaining communication band information obtaining unit.

In the present invention, it is possible to prevent a collapse of streaming data distribution that might occur due to a lack of the communication band. It is possible to maintain a fine communication environment.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of communication band information stored in a total communication band information storage unit;

FIG. 4A is a diagram showing another example of communication band information stored in the total communication band information storage unit, and FIG. 4B is a diagram showing an example of content list information stored in an open content information storage unit;

FIG. 5 is a block diagram showing detailed configurations of an open content information management processing unit and a communication band management processing unit;

FIG. 16A is a diagram showing an example of a total communication band table stored in a total communication band table storage unit, and FIG. 16B is a diagram showing another example of the total communication band table;

FIG. 17 is a diagram showing an example of a communication means selection table stored in a communication means selection table storage unit;

DETAILED DESCRIPTION OF THE PREFERRED EMBODIMENTS

First Embodiment

With references to FIG. 1 to FIG. 6, a first embodiment that embodies the communication apparatus according to the present invention will be explained. In the first embodiment, an example case where the communication apparatus as a server device is connected to a network and builds up a wireless communication system with a plurality of client devices will be explained.

Figure 1:
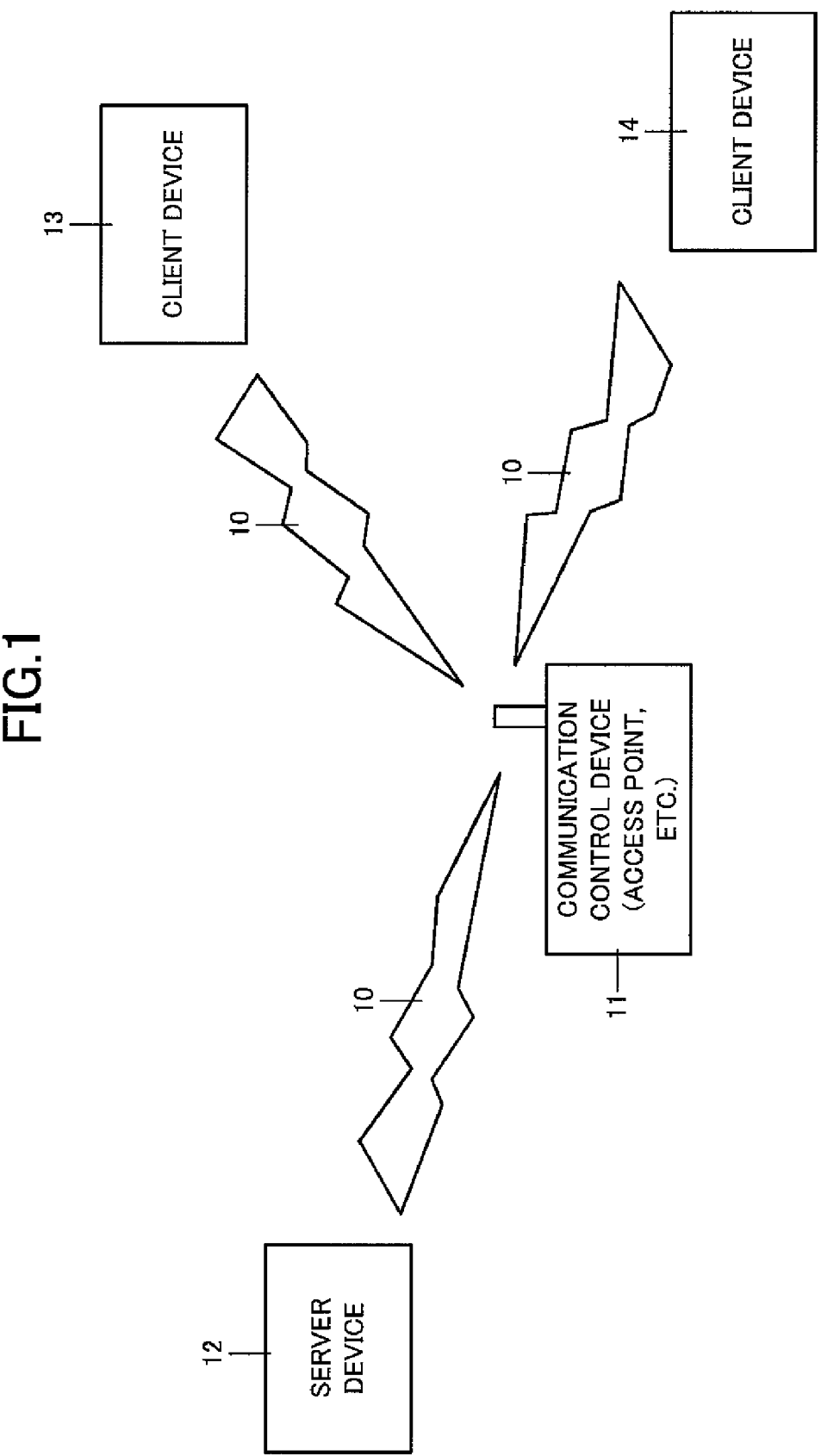
FIG. 1 is a diagram about a first embodiment of a communication apparatus according to the present invention, showing an overview of a communication system built up by the communication apparatus.

As shown in FIG. 1, the communication system according to the present embodiment includes a server device 12 that stores and distributes content data, client devices 13 and 14 on which content data is viewed or listened to, and a communication control device 11 that controls communications (IP communications) between the server device and the client devices. The server device 12 and the client devices 13 and 14 are connected to a network 10 via the communication control device 11. The communication control device 11 is constituted by an access point, a switching hub, or the like that supports a wireless communication system such as IEEE 802.11n. Each of the server device 12 and client devices 13 and 14 is a device that supports Universal Plug and Play (UPnP).

The UPnP specifications provide a technique for connecting devices in one's home such as personal computers and peripheral devices, AV equipment, telephone sets, electric appliances to each other via a network for them to mutually provide a functional aid. The UPnP specifications name device, service, and control point as the basic elements of a network. A "device" is one that supports UPnP. A "service" is the minimum unit that expresses a function provided by a device. A "control point" is where a service held by a device is controlled and used. Each device holds at least one service, but one device may not necessarily hold only one function. One device may hold a plurality of device functions. Further, a function may be an integration of a control point and a device.

In the communication system according to the present embodiment, the client devices 13 and 14 constitute control points as described above. The server device 12 is a device that holds a service of a media server, which is prescribed by Universal Plug and Play Audio Visual (UPnP AV: a version of the UPnP specifications that is specialized for AV contents). The server device 12 stores content data and provides them to the client devices 13 and 14.

Figure 2:
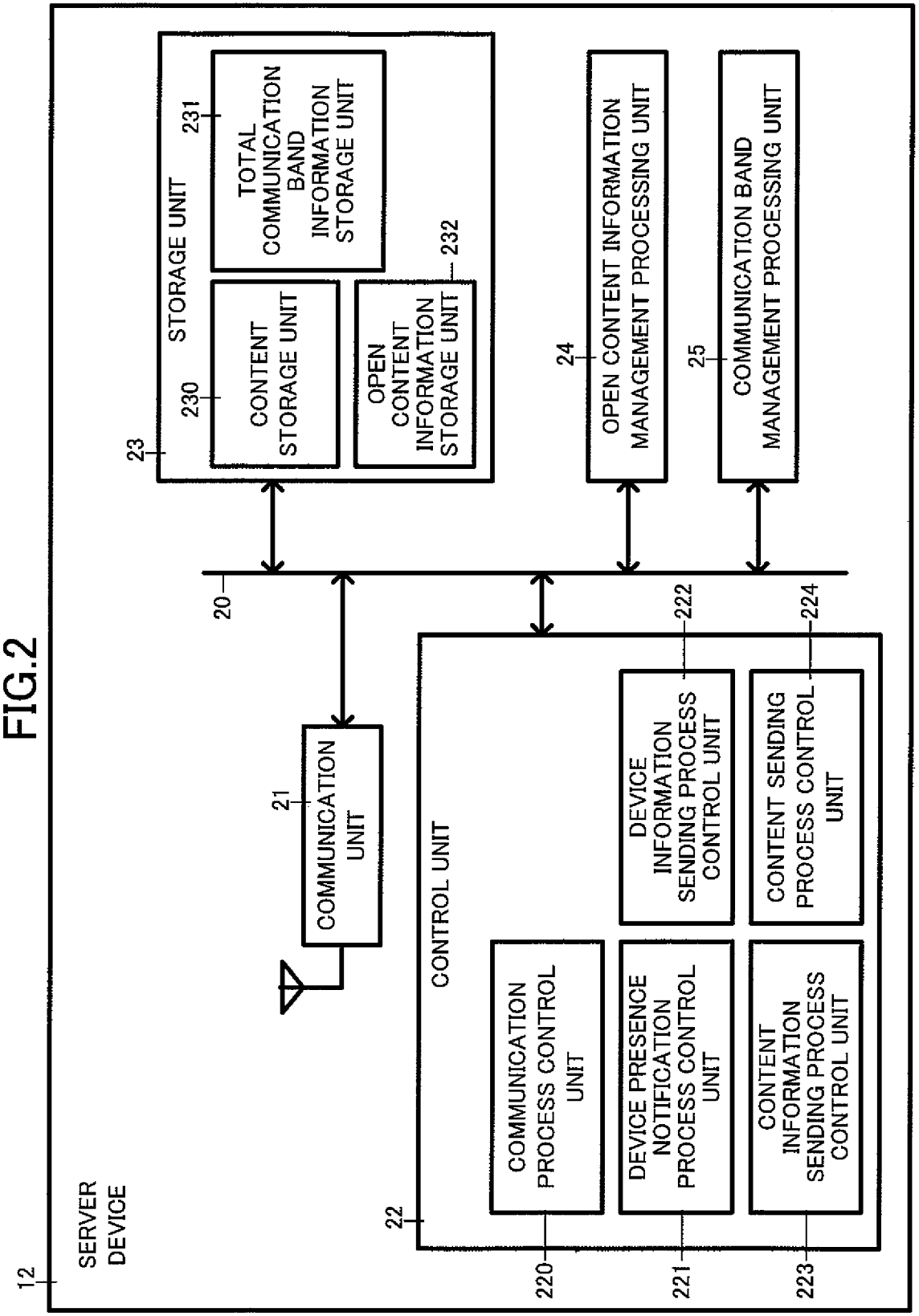
FIG. 2 is a block diagram showing a schematic configuration of the communication apparatus according to the first embodiment.

As shown in detail in FIG. 2, the server device 12 includes a communication unit 21, a control unit 22, a storage unit 23, an open content information management processing unit 24, and a communication band management processing unit 25. These units 21 to 25 are connected to one another via a bus 20.

The communication unit 21 is a communication interface for performing IP communications on the network 10. A modem circuit and a communication protocol (hereinafter they will be referred to as wireless access means) that support a wireless communication scheme (or a wireless communication standard) such as wireless LAN, Code Division Multiple Access (CDMA), etc. are implemented on the communication unit 21. The communication unit 21 receives and sends data of various kinds. The communication unit 21 receives various requests from, for example, the client devices 13 and 14, for example, a request to retrieve device information or a request to retrieve content information, and sends device information, content information, and further content data, etc.

The control unit 22 is constituted by, for example, a Central Processing Unit (CPU) or the like, and executes a predetermined control program to control the operation of the whole server device 12. The control program executed by the control unit 22 enables the server device 12 to demonstrate its functions as a device and functions as a media server prescribed by the UPnP AV mentioned above.

More specifically, the control unit 22 includes, as shown in FIG. 2, a communication process control unit 220, a device presence notification process control unit 221, a device information sending process control unit 222, a content information sending process control unit 223, and a content sending process control unit 224.

The communication process control unit 220 instructs the communication unit 21 to change the operation status of its communication function thereby to control (change) the operation status to, for example, acquisition of a wireless signal, sending, receiving, standby for receiving, etc. Together, the communication process control unit 220 manages the operation status of the communication function (to be detailed later) held by the communication unit 21.

The device presence notification process control unit 221 sends such notifications as (1) a device presence notification for when the server device 12, in which the device presence notification process control unit 221 is included, is connected to the network 10, to advertise that the server device 12 is present on the network, and (2) a device separation notification for when the server device 12 is disconnected from the network 10, to advertise that the server device 12 is separated from the network. The device presence notification process control unit 221 sends such notifications and controls sending of them. The device presence notification process control unit 221 also receives, among requests from the client devices 13 and 14, a device presence notification request (i.e., a command for requesting a device presence notification) and controls receiving of such a request.

The device information sending process control unit 222 receives, among requests from the client devices 13 and 14, a detailed device information sending request, and controls receiving of such a request. The device information sending process control unit 222 also sends detailed device information to the client devices 13 and 14 and controls sending of such information. Detailed device information includes, for example, maker information indicating a fabrication serial number, a maker name, etc., and a list of services provided by the device, etc.

The content information sending process control unit 223 receives, among requests from the client devices 13 and 14, a content information sending request, and controls receiving of such a request. The content information sending process control unit 223 sends content information to the client devices 13 and 14, and controls sending of such information. Content information is stored in the server device 12 in the form of, for example, digital data. The content information includes information indicating the attributes and tiers of contents that can be provided to the client devices 13 and 14.

The content sending process control unit 224 receives, among requests from the client devices 13 and 14, a content data sending request, and controls receiving of such a request. The content sending process control unit 224 sends content data to the client devices 13 and 14, and controls sending of such data. When the content sending process control unit 224 starts sending a content to any of the client devices 13 and 14, it sends a notification to that effect (an event notification) to the open content information management processing unit 24 (to be more specific, to an open content information management control unit 540 shown in FIG. 5).

The storage unit 23 in the server device 12 roughly includes, as shown in FIG. 2, a content storage unit 230 that stores content data that the server device 12 provides to the client devices 13 and 14, a total communication band information storage unit 231 that stores information on a communication band that is available for use by the server device 12 to perform communications such as sending of contents, and an open content information storage unit 232 that stores information indicating a predetermined content list. Each of these units is a non-volatile memory medium such as a Read Only Memory (ROM), a Hard Disk Drive (HDD), etc. The content list information mentioned above includes a list of content data (content candidate information) that can be provided by the server device 12 to the client devices 13 and 14, and related information. For example, when the content information sending process control unit 223 sends content information to the client device 13 or 14, it refers to the content list information and sends content information that can be provided thereto.

Figure 3:
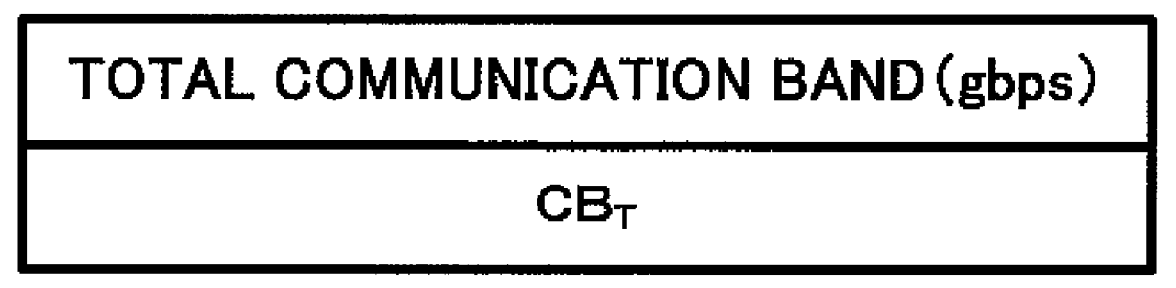

The communication band information stored in the total communication band information storage unit 231 includes total communication band information. The total communication band information indicates a communication band that is available for performing a communication such as sending of a content, when the server device 12 is not performing any communication. The total communication band information may be expressed as a transfer rate $CB_T$ (an arbitrary value) as shown in FIG. 3, or may be expressed as a transmission load (e.g., "100") as shown in FIG. 4A.

The content list information stored in the open content information storage unit 232 includes information about a data communication band, which is a communication band required for transmission of content data of each content data candidate.

For example, the content list information mentioned above is in the form of a transmission load calculation table as shown in FIG. 4B that includes such items as "index number (#)", "kind", "image quality", "codec", "transmission load", etc. "Index number" is assigned on a group-by-group basis as an identifier of each group, where each group is made up of "kind", "image quality", "codec", and "transmission load". "Kind" indicates a kind of a content, such as video, audio, etc. "Image quality" is a parameter that indicates the image resolution (e.g., SD, HD, Full High Definition (Full HD), QVGA, etc.) of a content. "Codec" indicates a codec scheme (e.g., MP3, MPEG2, MPEG4, H.264, etc.) of a content. "Transmission load" is a value that is uniquely determined by the three parameters of "kind", "image quality", and "codec", and indicates the width of a communication band (data communication band) used for sending content data.

This transmission load calculation tables tells that in a case where the transmission load is "100" as shown in FIG. 4A, it is possible to simultaneously send three such contents whose codec is MPEG 2 and whose image quality is Full HD (=transmission load "96") and one such content whose codec is MPEG 2 and whose image quality is SD (=transmission load "4"). The parameter to indicate the image quality may be content size (pixel number), frame rate, transfer rate, etc. The example shown in FIG. 4B includes only one kind, which is "Video", but may include audio contents. In the example of FIG. 4B, the parameters to determine the transmission load are "kind", "image quality", and "codec", but other parameters such as "frame rate information of a content", "transfer rate information", "content size information", etc. may be used to calculate (determine) the transmission load. The table of FIG. 4B is assumed for sending of contents by streaming. However, the table may also cover such communications as Voice Over IP (VoIP) communications that require real time transmission, communications for downloading or uploading of contents, or such a table may be created for each of these various types of communications. By increasing the number of parameters for determining the transmission load, the number of kinds of contents, or the number of types of communications, it is possible to improve the accuracy of the communication band management.

The data communication band information may be of any kind and in any format, as long as it can specify the band and the communication rate required for sending a content. For example, the data communication band information may be a table that associates a content data candidate with a transfer rate that indicates a communication amount per unit time period required for sending the content.

The total communication band information may be expressed as the number of contents that can be sent simultaneously, other than being expressed as exemplified in FIG. 3 and FIGS. 4A and 4B. In the case of relying on the number of contents, the communication band is not managed on the basis of such parameters as image quality, codec, etc. of contents. Therefore, the accuracy of the communication band management is poorer than in the case of FIGS. 4A and 4B, but there is a merit that the server device 12 can easily manage the communication band.

The method for storing the total communication band information (for example, the information shown in FIG. 3 or FIGS. 4A and 4B) in the total communication band information storage unit 231 may be to pre-store it when the product is shipped from the manufacturer. Another method may be, for example, to have the user enter the model number of the server device 12 or of the communication control device 11 (FIG. 1) to retrieve via the network 10 (via the server) total communication band information corresponding to that model number and store it in the total communication band information storage unit 231.

The open content information management processing unit 24 (FIG. 2) of the server device 12 includes, as shown in detail in FIG. 5, an open content information management control unit 540 that controls processes of the whole open content information management processing unit 24, an unsendable content extracting unit 542 that extracts un-sendable contents, i.e., contents that have a transfer rate equal to or greater than a remaining communication band, based on the information on a remaining communication band (to be described in detail later) that is calculated (determined) by a remaining communication band calculating unit 550, an unsendable content possession determining unit 543 that determines whether or not there is any content that cannot be sent to a client device, based on the result of extraction by the un-sendable content extracting unit 542, and an open content information updating unit 541 that updates the content list information in the open content information storage unit 232 based on the information extracted by the un-sendable content extracting unit 542. The open content information management processing unit 24 with this configuration generates or updates content information (content list information) stored in the open content information storage unit 232.

The communication band management processing unit 25 FIG. 2) of the server device 12 includes, as shown in detail in FIG. 5, a total communication band retrieving unit 551 that retrieves the total communication band information by referring to the total communication band information storage unit 231 (FIG. 2), a communication band in use calculating unit 552 that calculates a band being used for communication (hereinafter referred to as communication band in use information) by referring to a content sending status that is managed by the content sending process control unit 224 (FIG. 2), and a remaining communication band calculating unit 550 that calculates remaining communication band information based on the pieces of information retrieved and calculated by these units 551 and 552. The communication band management processing unit 25 with this configuration manages communication band information (remaining communication band information) that is left available for use by the server device 12. The remaining communication band information managed here indicates a communication band that can be used by the communication server 12 to perform a communication in parallel while already performing any other communication such as sending of a content, etc. That is, when the server device 12 is not performing any communication, the total communication band and the remaining communication band are equal.

More specifically, in the case of the total communication band information shown in FIG. 3 for example, the communication band in use calculating unit 552 calculates communication band in use information by referring to the transfer rate of the content that is now being sent in the content list information stored in the open content information storage unit 232. In this calculation, the transfer rate of the content may be obtained in another manner such as dividing the file size of the content by the time taken to reproduce the content. In the case of the total communication band information shown in FIGS. 4A and 4B, the communication band in use calculating unit 552 calculates the transmission load of any content that is now being sent by referring to the transmission load calculation table of FIG. 4B stored in the total communication band information storage unit 231, and thereby obtains communication band in use information. When calculating communication band in use information, the communication band in use calculating unit 552 may refer to not only the content sending status managed by the content sending process control unit 224, but also communication statuses of other applications (VoIP communications, Internet communications, etc.) that are managed by the communication process control unit 220. By doing so, the communication band in use calculating unit 552 can calculate communication band in use information that is more accurate.

The remaining communication band calculating unit 550 uses the communication band in use information obtained by the communication band in sue calculating unit 552 and subtracts this communication band in use information from the total communication band information retrieved by the total communication band retrieving unit 551 to calculate remaining communication band information.

Figure 6:
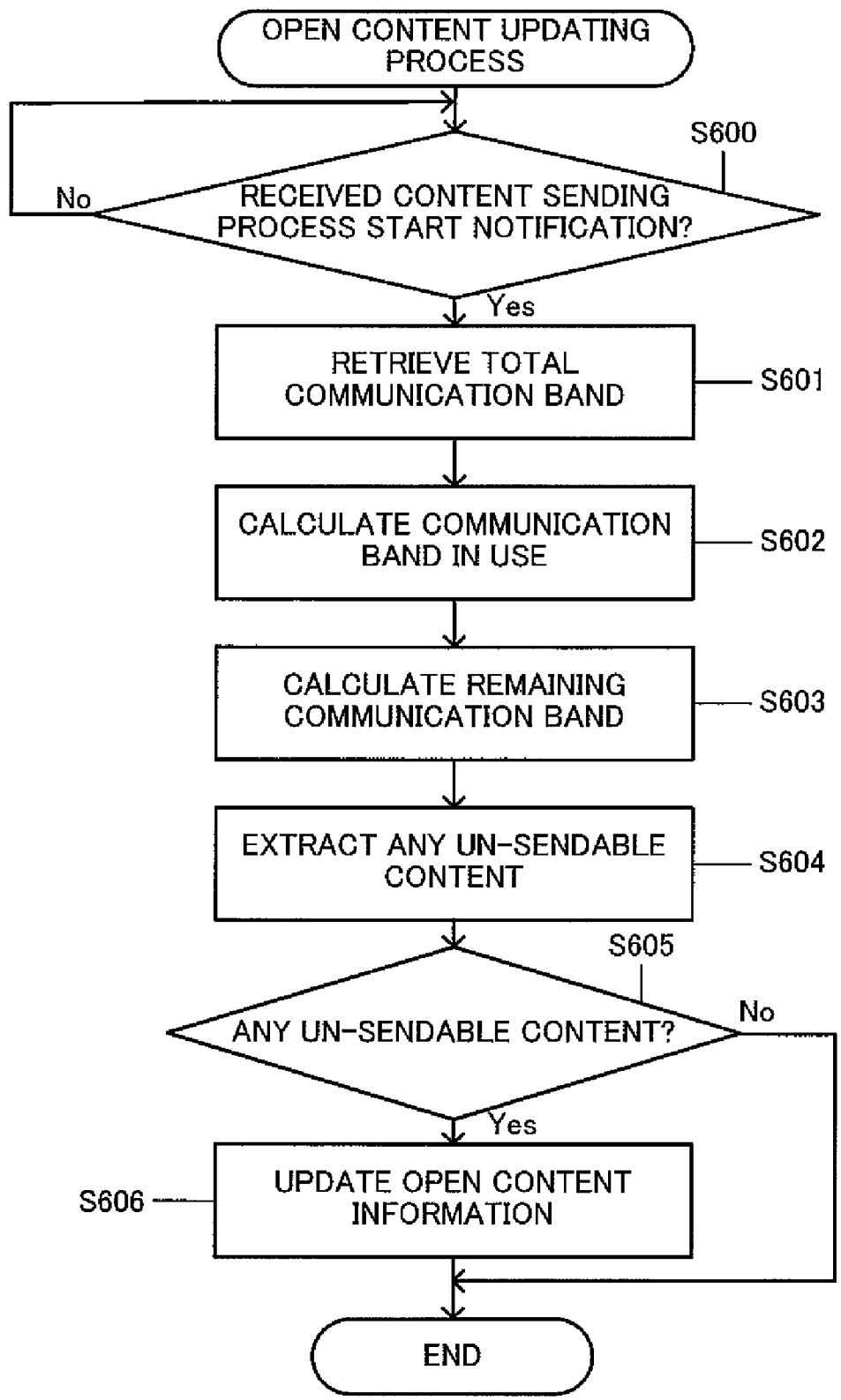
FIG. 6 is a flowchart showing a process procedure of content data sending control by the communication apparatus according to the first embodiment.

An example operation of the communication apparatus (server device 12) according to the first embodiment having the above configuration for generating (updating) content list information stored in the open content information storage unit 232 will now be explained. The server device 12 performs a process as shown in FIG. 6 for generating content list information. Specifically, the server device 12 starts the process of FIG. 6 when the server device 12 is turned on, and repetitively performs the process of FIG. 6 by re-starting the process each time the process is completed.

In the process of FIG. 6, the open content information management control unit 540 determines at step S600 whether or not it has received an event notification from the content sending process control unit 224, and repeatedly performs this reception determination at step S600 until it determines that it has received an event notification. An event notification is sent to the open content information management control unit 540 by the content sending process control unit 224 when the content sending process control unit 224 starts sending content data to any of the client devices 13 and 14 (hereinafter this any of the client devices 13 and 14 will be referred to as requesting client).

When it is determined at step S600 that an event notification is received (step S600; Yes), retrieval of the total communication band information is performed at the next step S601. At this retrieval of the total communication band information, the open content information management control unit 540 requests the remaining communication band calculating unit 550 to calculate remaining communication band information. At this request, the remaining communication band calculating unit 550 instructs (requests) the total communication band retrieving unit 551 to retrieve the total communication band information. In response to this instruction (request), the total communication band retrieving unit 551 refers to the total communication band information storage unit 231 and retrieves the total communication band information.

At the next step S602, the communication band in use calculating unit 552, which is at the request of the remaining communication band calculating unit 550, calculates communication band in use information by referring to a content data sending status managed by the content sending process control unit 224 and the content list information stored in the open content information storage unit 232. To calculate communication band in use information, the communication band in use calculating unit 552 may calculate a transmission load that indicates communication band in use information, by referring to the transmission load translation table (FIG. 4B).

At the next step S603, the remaining communication band calculating unit 550 calculates remaining communication band information based on the total communication band information and the communication band in use information that have been retrieved and calculated at the step S601 and step S602. Then, the remaining communication band calculating unit 550 sends the calculated remaining communication band information to the open content information management control unit 540.

At the next step S604, the open content information management control unit 540 requests the un-sendable content extracting unit 542 to extract any content data that has a transfer rate equal to or greater than the remaining communication band. At this request, the un-sendable content extracting unit 542 extracts any content data that has a transfer rate equal to or greater than the remaining communication band, i.e., content data that cannot be sent to the client device (requesting client), based on the remaining communication band information calculated at step S603.

At the next step S605, the open content information management control unit 540 requests the un-sendable content possession determining unit 543 to perform determination. At this request, the un-sendable content possession determining unit 543 determines whether or not there is any content data that cannot be sent to the client device by using the result of extraction at step S604, and sends the result of determination to the open content information management control unit 540. In a case where the un-sendable content possession determining unit 543 determines in the determination at step S605 that there is not content data that cannot be sent (step S605; No), the process of FIG. 6 is terminated. On the contrary, in a case where the un-sendable content possession determining unit 543 determines in the determination at step S605 that there is any content data that cannot be sent (step S605; Yes), the process flow goes to step S606.

At this step S606, the open content information management control unit 540 requests the open content information updating unit 541 to update the content list information. At this request, the open content information updating unit 541 updates the content list information in the open content information storage unit 232 based on the information extracted at step S604. In this updating of the content list information, the open content information updating unit 541 excludes any content that has been extracted by the un-sendable content extracting unit 542 from the content list information in the open content information storage unit 232 so that a request from the client device 13 or 14 for that content data to be streaming-sent thereto may not be received. By being excluded from the content list information, any content data whose data communication band is equal to or greater than the communication band will not be publicized open to the client devices 13 and 14.

As has been explained, the communication apparatus according to the first embodiment can achieve the following effects.

(1) The communication apparatus (server device 12) according to the present embodiment includes: access means (communication unit 21) that accesses the network 10; content information storage means (open content information storage unit 232) that retains content candidate information (content list information) that indicate content data candidates that may be sent to the client device 13 or 14 from the server device 12, which is a communication apparatus for sending predetermined content data to any other communication apparatuses (client devices 13 or 14) via the network 10; remaining communication band calculating means (remaining communication band calculating unit 550, step S603 in FIG. 6) that calculates remaining communication band information that indicates a communication band, out of the total communication band available for use by the server device 12, that can be used at that time concerned; content sending means (content sending process control unit 224) that sends one or more of the content data candidates indicated in the content list information to the client device 13 or 14; and communication control means (open content information management processing unit 24) that controls sending of content data by the content sending process control unit 224, based on the content list information retained by the open content information storage unit 232 and the remaining communication band information calculated by the remaining communication band calculating unit 550. This configuration enables sending of content data to the client device 13 or 14 to be performed in a manner that suits the remaining communication band information. Therefore, even in a case where, for example, distribution of streaming data is started when already another streaming distribution has been performed, no such communication disturbance will occur that the later one hijacks the band for the existing streaming distribution and causes a delay in the existing streaming distribution, making it possible to maintain a fine communication environment.

(2) In the server device 12, the open content information management processing unit 24 prohibits sending of one or more of the content data candidates indicated in the content list information, based on the content list information retained by the open content information storage unit 232 and the remaining communication band information calculated by the remaining communication band calculating unit 550. By prohibiting sending of content data based on the remaining communication band information, it is possible to send only such data that suit the remaining communication band information among the candidates indicated in the content list information.

(3) In the server device 12, the content list information retained by the open content information storage unit 232 indicates, for each content data candidate, a data communication band (e.g., transfer rate, transmission load, or the like), which is a communication band required for transmitting the content data (FIG. 4B). The open content information management processing unit 24 includes: the un-sendable content extracting unit 542 that extracts any content data that has a data communication band equal to or greater than a remaining communication band based on the remaining communication band information calculated by the remaining communication band calculating unit 550 and the content list information retained by the open content information storage unit 232 (step S604 in FIG. 6); the un-sendable content possession determining unit 543 that determines whether or not there is any content data that has a data communication band equal to or greater than the remaining communication band, based on any content data extracted by the un-sendable content extracting unit 542 (step S605 in FIG. 6); and content candidate updating means (open content information updating unit 541) that, in a case where the un-sendable content possession determining unit 543 determines that there is any content data that has a data communication band equal to or greater than the remaining communication band, excludes the content data that has the data communication band equal to or greater than the remaining communication band from the content list information retained by the open content information storage unit 232 thereby to prohibit sending of this content data (step S606 in FIG. 6). With this configuration, it is possible to send only such content data that would cause no disorders in the reproduced images or no sound interruptions to the client devices 13 and 14, based on the content list information that includes only such content data that have a data communication band equal to or smaller than the remaining communication band.

(4) The server device 12 includes: total communication band information storage means (total communication band information storage unit 231) that retains total communication band information that indicates a total communication band that can be used by the server device 12 to perform communications; and communication band in use calculating means (communication band in use calculating unit 552) that calculates communication band in use information that indicates a communication band, out of the total communication band, that is used for sending content data at the time concerned, based on the content list information retained by the open content information storage unit 232 (steps S601 and S602 in FIG. 6). The remaining communication band calculating unit 550 calculates remaining communication band information based on the total communication band information retained by the total communication band information storage unit 231 and the communication band in use information calculated by the communication band in use calculating unit 552. With this configuration, it is possible to calculate remaining communication band information with high accuracy.

(5) The server device 12 includes content sending start determining means (open content information management control unit 540) that determines whether or not the content sending process control unit 224 has started sending content data to the client device 13 or 14 (step S600 in FIG. 6). When the open content information management control unit 540 determines that sending of content data has been started, the remaining communication band calculating unit 550 calculates remaining communication band information. With this configuration, it is possible to re-calculate remaining communication band information each time sending of content data to the client device 13 or 14 is started, thereby to obtain more accurate information.

Second Embodiment

Next, with reference to FIG. 7 and FIG. 8, a second embodiment that embodies the communication apparatus according to the present invention will be explained. Here, points that make the present embodiment differ from the first embodiment described above will mainly be explained, and any points that the present embodiment has in common with the first embodiment will not be explained.

Figure 7:
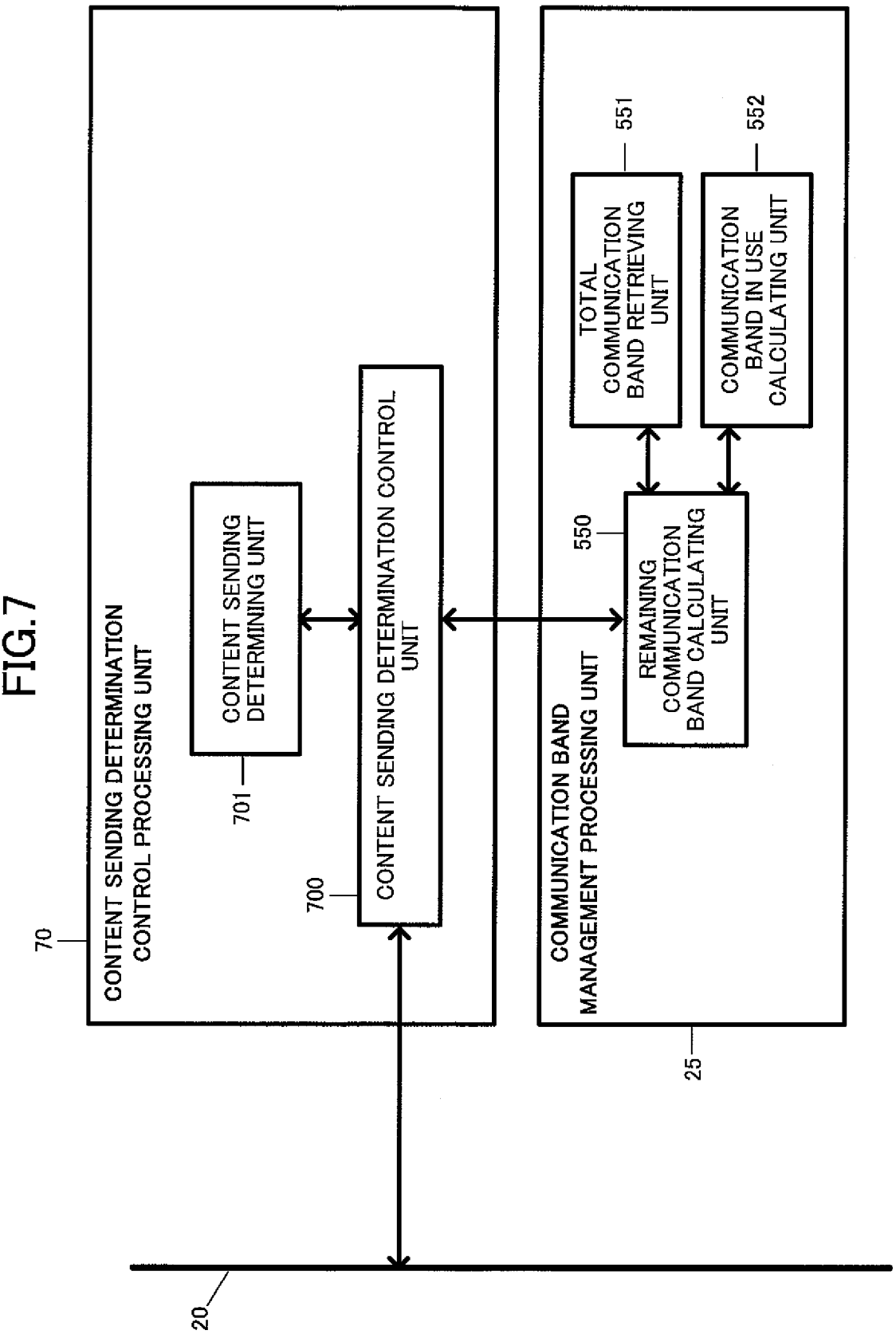
FIG. 7 is a block diagram about a second embodiment of the communication apparatus according to the present invention, showing a schematic configuration of the communication apparatus.

The communication apparatus (server device 12) according to the present embodiment includes a content sending determination control processing unit 70 shown in FIG. 7, in place of the open content information management processing unit 24 (FIG. 2 and FIG. 5) of the first embodiment.

As shown in FIG. 7, the content sending determination control processing unit 70 roughly includes: a content sending determination control unit 700 that controls the process of the whole content sending determination control processing unit 70; and a content sending determining unit 701 that determines whether the remaining communication band is abundant or scarce.

To be more specific, the content sending determination control unit 700 receives a notification about a request from a client from the content sending process control unit 224, and requests the remaining communication band calculating unit 550 to calculate remaining communication band information. Then, the content sending determination control unit 700 obtains the remaining communication band information calculated by the remaining communication band calculating unit 550 (calculated in the same manner as in the first embodiment), and notifies the remaining communication band information to the content sending determining unit 701. Note that the notification from the content sending process control unit 224 about a request from a client is sent by the content sending process control unit 224 when any of the client devices 13 and 14 (requesting client) has given a request for content data to be sent thereto by streaming.

The content sending determining unit 701 determines whether or not there is a communication band left enough to streaming-send data to the client device, by comparing the remaining communication band information notified (sent) by the content sending determination control unit 700 with the transfer rate (retrieved from the content list information, for example) of the content data that the client device (requesting client) has requested to be streaming-sent thereto, and sends the result of the determination to the content sending determination control unit 700.

Next, an example of an operation of the communication apparatus (server device 12) according to the second embodiment having the above-described configuration for generating a response to a request from a client device (requesting client) for content data to be sent thereto will be explained. That is, the server device 12 performs a process as shown in FIG. 8 for generating such a response. Specifically, the server device 12 starts the process shown in FIG. 8 when the power of the server device 12 is turned on, and repetitively performs the process of FIG. 8 by re-starting the process each time the process is completed.

Figure 8:
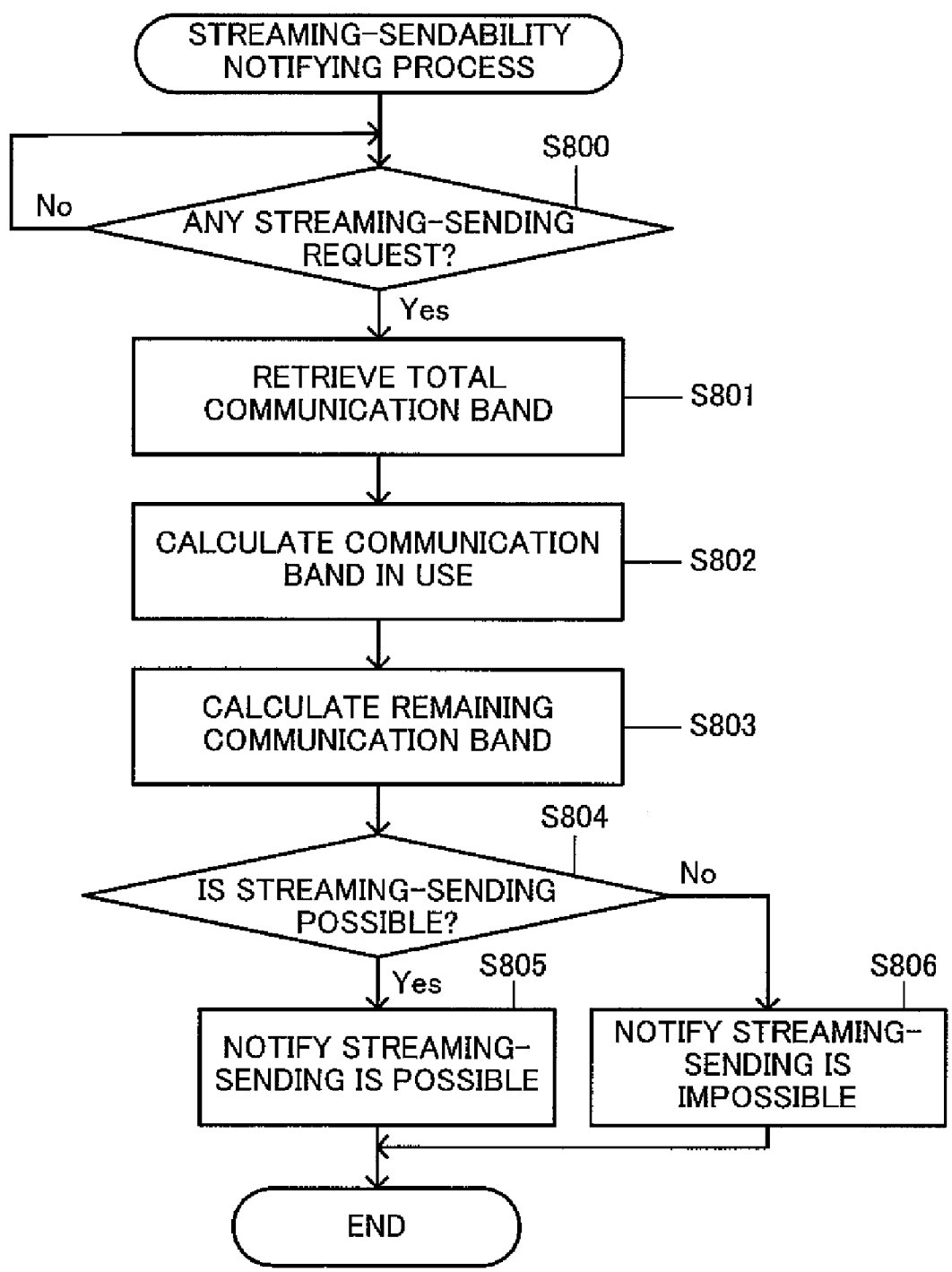
FIG. 8 is a flowchart showing a process procedure of content data sending control by the communication apparatus according to the second embodiment.

In the process of FIG. 8, the content sending determination control unit 700 determines whether or not it has received an event notification from the content sending process control unit 224 at step S800, and performs this reception determination repetitively at step S800 until it determines that it has received an event notification. An event notification is sent to the content sending determination control unit 700 from the content sending process control unit 224 when the content sending process control unit 224 receives a streaming-sending request from any of the client devices 13 and 14 (requesting client).

Then, when it is determined at step S800 that an event notification has been received (step S800; Yes), the same processes as those at steps S601 to S603 (first embodiment) described above are performed at the subsequent steps S801 to S803. However, it should be noted that the communication band management processing unit 25 of the present embodiment is controlled by the content sending determination control unit 700 as shown in FIG. 7, not by the open content information management control unit 540 described above.

After remaining communication band information is calculated at step S803, the content sending determination control unit 700 requests the content sending determining unit 701 to perform determination at the succeeding step S804. At this request, the content sending determining unit 701 determines whether or not the transfer rate of the content data that the client device (requesting client) has requested to be streaming-sent thereto is equal to or smaller than the remaining communication band.

In a case where the content sending determining unit 701 determines in the determination process at step S804 that the transfer rate of the content data that the client device (requesting client) has requested to be streaming-sent thereto is equal to or greater than the remaining communication band, i.e., in a case where it is determined that the streaming-sending is impossible (step S804; No), the content sending determination control unit 700 notifies the content sending process control unit 224 at the next step S806 that streaming-sending is impossible. After this, the content sending process control unit 224 sends a response to the streaming-sending request, to which response an appropriate HTTP status code is set, to the client device (requesting client) via the communication unit 21 (FIG. 2).

On the other hand, in a case where the content sending determining unit 701 determines in the determination process at step S804 that the transfer rate of the content data is equal to or smaller than the remaining communication band, i.e., in a case where it is determined that streaming-sending is possible (step S804; Yes), the content sending determination control unit 700 notifies the content sending process control unit 224 at the next step S805 that streaming-sending is possible. After this, the content sending process control unit 224 sends the requested content data to the client device (requesting client) via the communication unit 21.

As explained above, the communication apparatus according to the second embodiment can achieve the following effect in addition to the above-described effects (1), (2), and (4).

(6) The communication apparatus (server device 12) according to the present embodiment includes streaming-sending request determining means (content sending determination control unit 700) that determines whether or not streaming-sending request for any content data candidate indicated in the content list information has been given from the client device 13 or 14 (step S800 in FIG. 8). The content list information indicates for each content data candidate, a data communication band, which is a communication band required for transmitting the content data. The server device 12 further includes the content sending determination control processing unit 70 that prohibits sending of one or more of the content data candidates indicated in the content list information, based on the content list information and the remaining communication band information. This content sending determination control processing unit 70 includes: content sending determining means (content sending determining unit 701) that, when the content sending determination control unit 700 determines that there is a streaming-sending request, determines whether or not the data communication band of the content data, for which the streaming-sending request has been given, is equal to or smaller than the remaining communication band, based on the remaining communication band information calculated by the remaining communication band calculating unit 550 and the content list information retained by the open content information storage unit 232 (step S804 in FIG. 8); and a streaming-sending prohibiting unit (content sending determination control unit 700) that prohibits sending of the content data, for which the streaming-sending request has been given, in a case where the content sending determining unit 701 determines that the data communication band of the content data, for which the streaming-sending request has been given, is not equal to or smaller than the remaining communication band (step S806 in FIG. 8). This makes it possible to send only such content data that would cause no disorders in the reproduced images or no sound interruptions to the client device 13 or 14.

Third Embodiment

Next, with reference to FIG. 9 and FIG. 10, a third embodiment that embodies the communication apparatus according to the present invention will be explained. Here, points that make the present embodiment differ from the first embodiment described above will mainly be explained and points that the present embodiment has in cotton with the first embodiment will not be explained.

Figure 9:
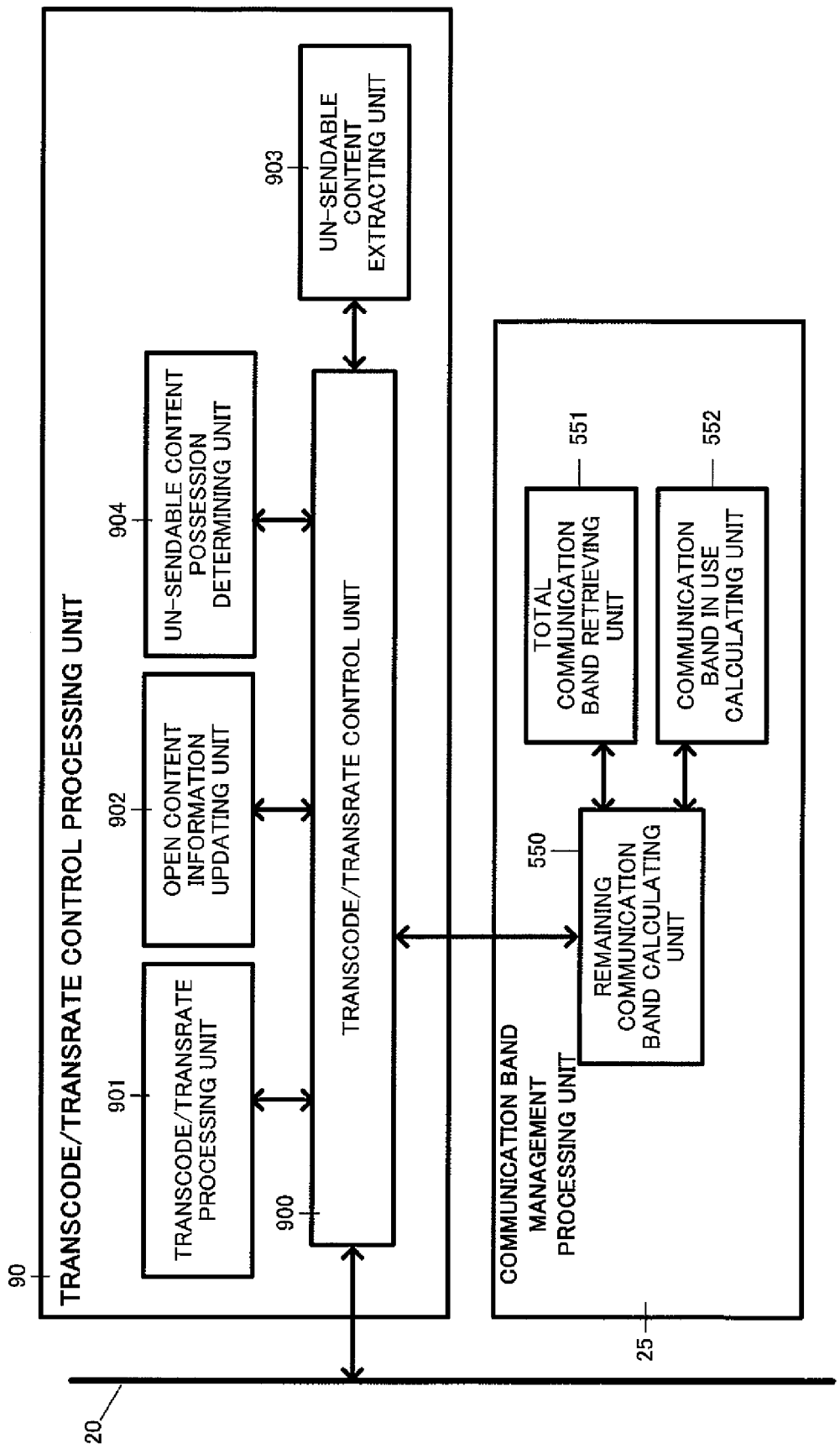
FIG. 9 is a block diagram about a third embodiment of the communication apparatus according to the present invention, showing a schematic configuration of the communication apparatus.

The communication apparatus (server device 12) according to the present embodiment includes a transcode or transrate control processing unit 90 as shown in FIG. 9, in place of the open content information management processing unit 24 (FIG. 2 and FIG. 5) of the first embodiment.

As shown in FIG. 9, the transcode or transrate control processing unit 90 roughly includes: a transcode or transrate control unit 900 that controls the process of the whole transcode or transrate control processing unit 90; an un-sendable content extracting unit 903 and an un-sendable content possession determining unit 904; a transcode or transrate processing unit 901 that transcodes any content data that is extracted by the un-sendable content extracting unit 903 so that the content data may have a transfer rate equal to or smaller than the remaining communication band; and an open content information updating unit 902 that updates the content list information in the open content information storage unit 232 based on the information obtained by the transcode or transrate processing unit 901.

The un-sendable content extracting unit 903 and the un-sendable content possession determining unit 904 have similar functions to those of the un-sendable content extracting unit 542 and the un-sendable content possession determining unit 543 (FIG. 5) of the first embodiment, respectively. That is, the un-sendable content extracting unit 903 extracts any content data that cannot be sent, i.e., any content data that has a transfer rate equal to or greater than the remaining communication band, based on the remaining communication band information calculated by the remaining communication band calculating unit 550. The un-sendable content possession determining unit 904 determines whether or not there is any content data that cannot be sent to a client device, based on the result of extraction by the un-sendable content extracting unit 903.

The open content information updating unit 902 updates the content list information by excluding the content data extracted by the un-sendable content extracting unit 903 from the content list information and instead adding the content data that has been transcoded by the transcode or transrate processing unit 901 so that it has a transfer rate equal to or smaller than the remaining communication band to the content list information as new content data.

Next, an example of an operation of the communication apparatus (server device 12) according to the third embodiment having the above-described configuration for generating (updating) content list information stored in the open content information storage unit 232 will be explained. That is, the server device 12 performs a process as shown in FIG. 10 for generating content list information. Specifically, the server device 12 starts the process of FIG. 10 when the power of the server device 12 is turned on, and repetitively performs the process of FIG. 10 by re-starting the process each time the process is completed.

Figure 10:
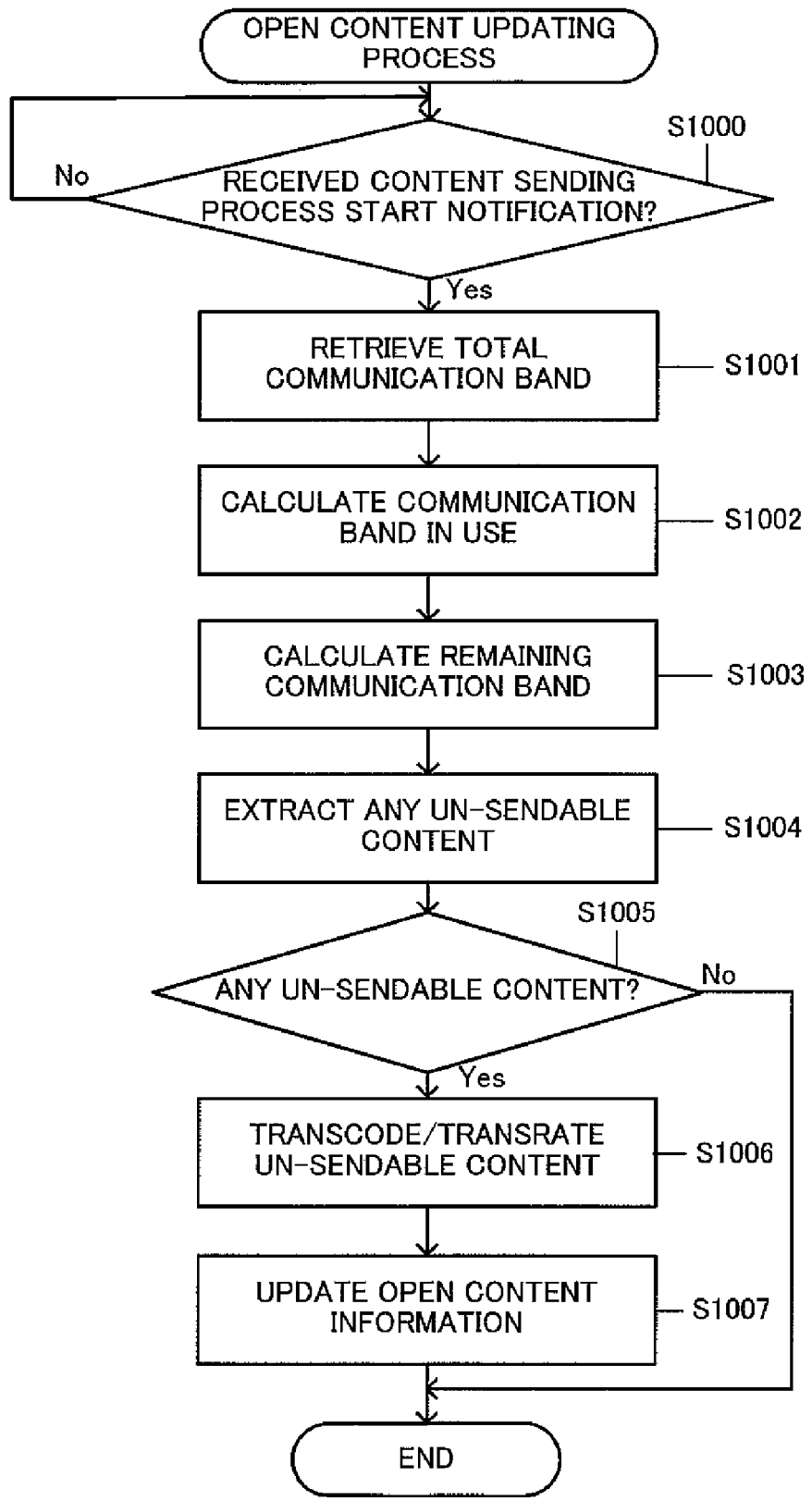
FIG. 10 is a flowchart showing a process procedure of content data sending control by the communication apparatus according to the third embodiment.

In the process of FIG. 10, the same processes as those at steps S600 to S605 (first embodiment) are performed at steps S1000 to S1005. However, it should be noted that the communication band management processing unit 25 of the present embodiment is controlled by the transcode or transrate control unit 900 as shown in FIG. 9, not by the open content information management control unit 540 described above.

In a case where the un-sendable content possession determining unit 904 determines in the determination process at step S1005 that there is no content data that cannot be sent (step S1005; No), the process of FIG. 10 is terminated. On the other hand, in a case where the un-sendable content possession determining unit 904 determines at step S1005 that there is any content data that cannot be sent (step S1005; Yes), the flow proceeds to step S1006.

At step S1006, the transcode or transrate control unit 900 receives a determination result from the un-sendable content possession determining unit 904. Then, in accordance with an instruction from the transcode or transrate control unit 900, the transcode or transrate processing unit 901 transcodes the content data that has been extracted at step S1004 by the un-sendable content extracting unit 903 so that it may have a transfer rate equal to or smaller than the remaining communication band.

Then, at step S1007, the transcode or transrate control unit 900 requests the open content formation updating unit 902 to update the content list information. Then, in response to this request (instruction), the open content information updating unit 902 updates the content list information in the open content information storage unit 232, based on the information transcoded at step S1006. In this updating of the content list information, the content data extracted by the un-sendable content extracting unit 903 is excluded from the content list information. Then, the content data that has been newly generated at step S1006 by transcoding that provides a transfer rate equal to or smaller than the remaining communication band is added to the content list information.

As explained above, the communication apparatus according to the third embodiment can achieve the following effects in addition to the above-described effects (1), (4), and (5).

(7) The communication apparatus (server device 12) according to the present embodiment includes the transcode or transrate control processing unit 90 that processes one or more of the content data candidates indicated in the content candidate information, based on the content list information retained by the open content information storage unit 232 and the remaining communication band information calculated by the remaining communication band calculating unit 550. Therefore, of the candidates indicated in the content candidate information, any content data that is not desirable in terms of the communication band can be translated into data that suits the remaining communication band information, by the processing by the transcode or transrate control processing unit 90.

(8) In the server device 12, the content list information retained by the open content information storage unit 232 includes, for each content data candidate, data communication band information that indicates a communication band required for transmitting the content data. The transcode or transrate control processing unit 90 includes: the un-sendable content extracting unit 903 that extracts any content data that has a data communication band equal to or greater than the remaining communication band, based on the content list information retained by the open content information storage unit 232 and the remaining communication band information calculated by the remaining communication band calculating unit 550 (step S1004 in FIG. 10); the un-sendable content possession determining unit 904 that determines whether or not there is any content data that has a data communication band equal to or greater than the remaining communication band, based on any content data extracted by the un-sendable content extracting unit 903 (step S1005 in FIG. 10); and a data processing unit (transcode or transrate processing unit 901) that, in a case where the un-sendable content possession determining unit 904 determines that there is any content data that has a data communication band equal to or greater than the remaining communication band, data-processes the content data so that it may have a data communication band equal to or smaller than the remaining communication band (step S1006 in FIG. 10). With this configuration, any content data that has a data communication band equal to or greater than the remaining communication band is processed into data whose communication band is equal to or smaller than the remaining communication band, and it becomes possible to send only such content data that has a data communication band equal to or smaller than the remaining communication band to the client device 13 or 14.

(9) In the server device 12, in a case where the un-sendable content possession determining unit 904 determines that there is any content data that has a data communication band equal to or greater than the remaining communication band, the transcode or transrate processing unit 901 transcodes all such data so that the data may have a data communication band equal to or smaller than the remaining communication band. And the server device 12 includes content candidate information updating means (open content information updating unit 902) that, after the transcoding process by the transcode or transrate processing unit 901, excludes the content data that has a data communication band equal to or greater than the remaining communication band from the content list information retained by the open content information storage unit 232 and newly includes the content data that has been transcoded to the content list information (step S1007 in FIG. 10). With this configuration, it is possible to send only such content data that would cause no disorders in the reproduced images or no sound interruptions to the client device 13 or 14, based on the content list information that includes only such content data that have a data communication band equal to or smaller than the remaining communication band.

Another compression process may be performed instead of transcoding. That is, anything will do as long as it can data-process content data so that it may have a data communication band equal to or smaller than the remaining communication band.

Fourth Embodiment

Next, with reference to FIG. 11 and FIG. 12, a fourth embodiment that embodies the communication apparatus according to the present invention will be explained. Here, points that make the present embodiment differ from the first embodiment will mainly be explained, and points that the present embodiment has in common with the first embodiment will not be explained.

Figure 11:
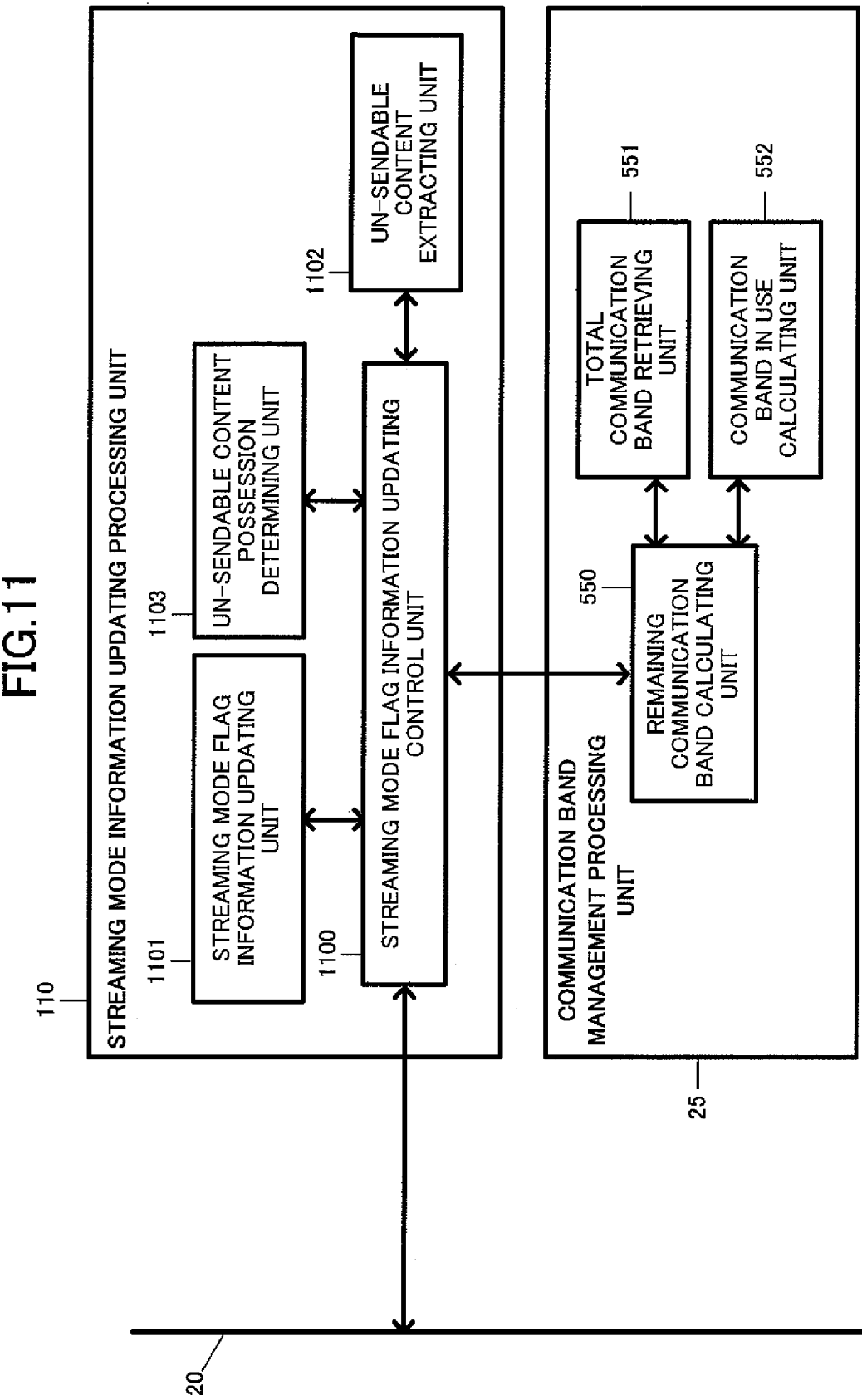
FIG. 11 is a block diagram about a fourth embodiment of the communication apparatus according to the present invention, showing a schematic configuration of the communication apparatus.

The communication apparatus (server device 12) according to the present embodiment includes a streaming mode information updating processing unit 110 as shown in FIG. 11, in place of the open content information management processing unit 24 (FIG. 2 and FIG. 5) of the first embodiment. The content list information stored in the open content information storage unit 232 includes a streaming mode flag for each content data candidate; which indicates whether it is possible or not to streaming-send the content data.

As shown in FIG. 11, the streaming mode information updating processing unit 110 roughly includes: a streaming mode flag information updating control unit 1100 that controls the process of the whole streaming mode information updating processing unit 110; an un-sendable content extracting unit 1102 and an un-sendable content possession determining unit 1103; and a streaming mode flag information updating unit 1101.

The un-sendable content extracting unit 1102 and the un-sendable content possession determining unit 1103 have similar functions to those of the un-sendable content extracting unit 542 and the un-sendable content possession determining unit 543 (FIG. 5) of the first embodiment, respectively. That is, the un-sendable content extracting unit 1102 extracts any content that cannot be sent, i.e., a content that has a transfer rate equal to or greater than the remaining communication band, based on the remaining communication band information calculated by the remaining communication band calculating unit 550. The un-sendable content possession determining unit 1103 determines whether or not there is any content that cannot be sent to a client device, based on the result of extraction by the un-sendable content extracting unit 1102.

The streaming mode flag information updating unit 1101 updates the content list information in the open content information storage unit 232 by setting the streaming mode flag to "FALSE (un-sendable)" for any content, in the content list information stored in the open content information storage unit 232, that has been extracted by the un-sendable content extracting unit 1102.

Next, an example of an operation of the communication apparatus (server device 12) according to the fourth embodiment having the above-described configuration for generating (updating) content list information stored in the open content information storage unit 232 will be explained. That is, the server device 12 performs a process as shown in FIG. 12 for generating content list information. Specifically, the server device 12 starts the process of FIG. 12 when the power of the server device 12 is turned on, and repetitively performs the process of FIG. 12 by re-starting the process each time the process is completed.

Figure 12:
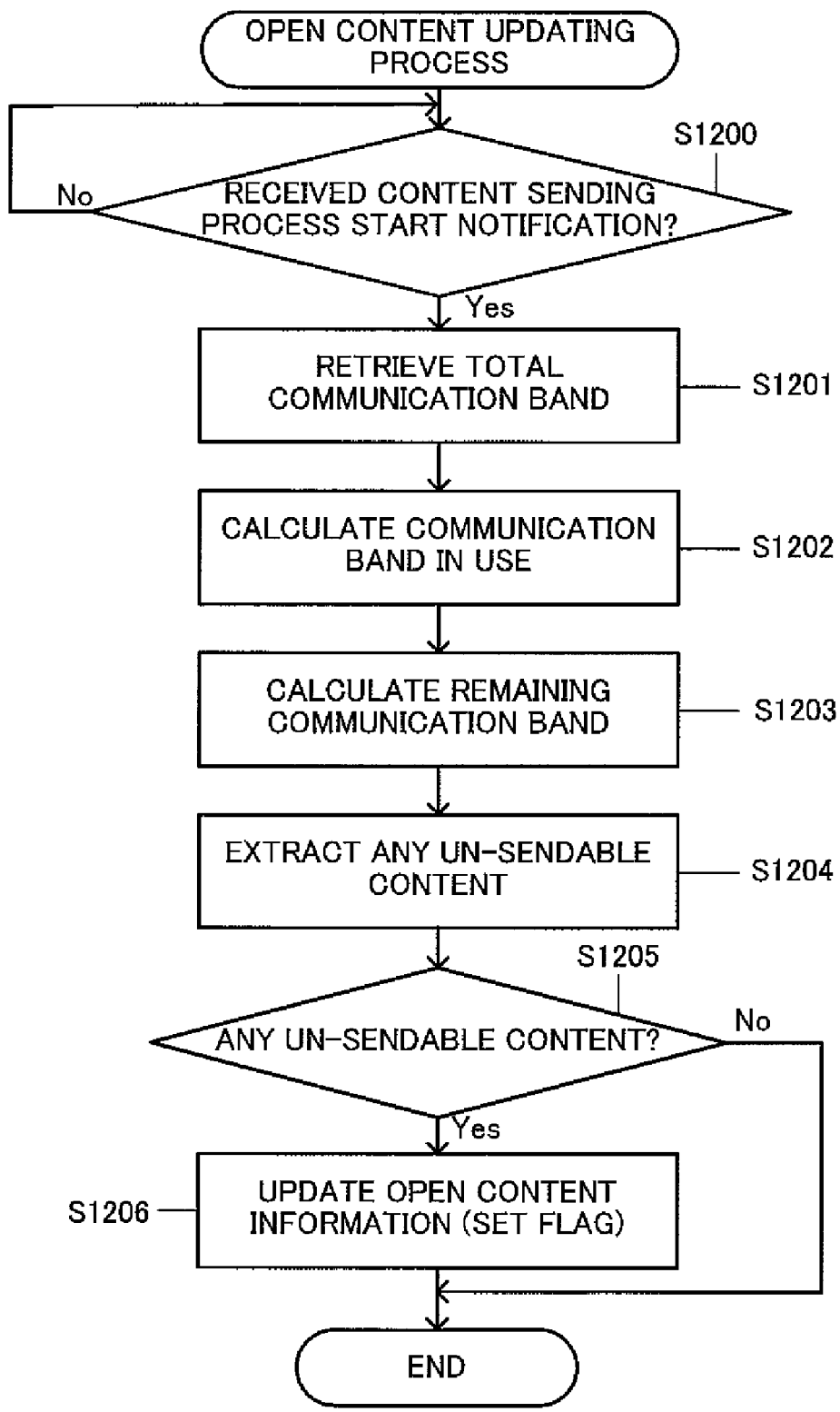
FIG. 12 is a flowchart showing a process procedure of content data sending control by the communication apparatus according to the fourth embodiment.

In the process of FIG. 12, the same processes as those at steps S600 to S605 (first embodiment) described above are performed at steps S1200 to S1205. However, it should be noted that the communication band management processing unit 25 of the present embodiment is controlled by the streaming mode flag information updating control unit 1100 as shown in FIG. 11, not by the open content information management control unit 540 described above.

In a case where the un-sendable content possession determining unit 1103 determines at step S1205 that there is no content that cannot be sent (step S1205; No), the process of FIG. 12 is terminated. On the other hand, in a case where the un-sendable content possession determining unit 1103 determines at step S1205 that there is any content that cannot be sent (step S1205; Yes), the flow proceeds to step S1206.

At step S1206, the streaming mode flag information updating control unit 1100 receives the determination result from the un-sendable content possession determining unit 1103. Then, at the request of the streaming mode flag information updating control unit 1100, the streaming mode flag information updating unit 1101 updates the content list information in the open content information storage unit 232, based on the information extracted at step S1204 by the un-sendable content extracting unit 1102. In this updating of the content list information, the streaming mode flag information updating unit 1101 sets the streaming mode flag of any content extracted by the un-sendable content extracting unit 1102 to "FALSE". As a result, any content that is set to "FALSE" is disabled for streaming distribution, and a streaming-sending request for such a content from the client device 13 or 14 will not be accepted.

As explained above, the communication apparatus according to the fourth embodiment can achieve the following effect in addition to the above-described effects (1), (2), (4), and (5).

(10) In the communication apparatus (server device 12) according to the present embodiment, the content list information retained by the open content information storage unit 232 indicates, for each content data candidate, a data communication band, which is a communication band required for transmitting the content data, and also includes a streaming mode flag that indicates whether it is possible or not to streaming-send the content data. The server device 12 includes the streaming mode information updating processing unit 110 that prohibits sending of one or more of the content data candidates indicated in the content list information, based on the content list information and the remaining communication band information. This streaming mode information updating processing unit 110 includes: the un-sendable content extracting unit 1102 that extracts any content data that has a data communication band equal to or greater than the remaining communication band, based on the content list information retained by the open content information storage unit 232 and the remaining communication band information calculated by the remaining communication band calculating unit 550 (step S1204 in FIG. 12); the un-sendable content possession determining unit 1103 that determines whether or not there is any content data that has a data communication band equal to or greater than the remaining communication band, based on any content data extracted by the un-sendable content extracting unit 1102 (step S1205 in FIG. 12); and a flag setting unit (streaming mode flag information updating unit 1101) that, in a case where the un-sendable content possession determining unit 1103 determines that there is any content data that has a data communication band equal to or greater than the remaining communication band, sets the streaming mode flag of the content data that has a data communication band equal to or greater than the remaining communication band, to "FALSE (un-sendable)" in the content list information retained by the open content information storage unit 232 (step S1206 in FIG. 12). Therefore, it is possible to send only such content data that would cause no disorders in the reproduced images or no sound interruptions to the client device 13 or 14.

Fifth Embodiment

Next, with reference to FIG. 13, a fifth embodiment that embodies the communication apparatus according to the present invention will be explained. Here, points that make the present embodiment differ from the first embodiment described above will be explained, and points that the present embodiment has in common with the first embodiment will not be explained.

Figure 13:
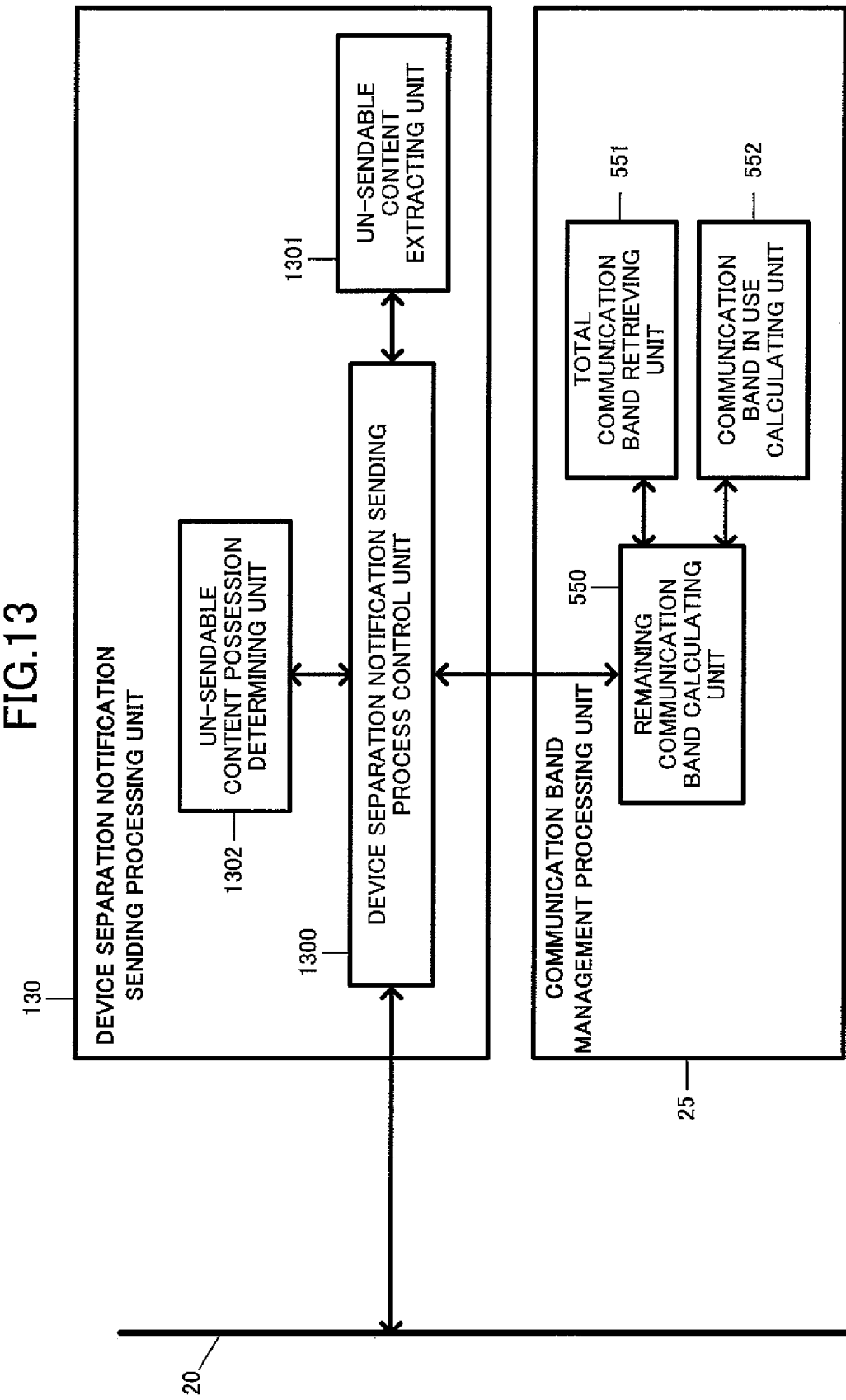
FIG. 13 is a block diagram about a fifth embodiment of the communication apparatus according to the present invention, showing a schematic configuration of the communication apparatus.

The communication apparatus (server device 12) according to the present embodiment includes a device separation notification sending processing unit 130 as shown in FIG. 13, in place of the open content information management processing unit 24 (FIG. 2 and FIG. 5) of the first embodiment.

As shown in FIG. 13, the device separation notification sending processing unit 130 roughly includes a device separation notification sending process control unit 1300, an un-sendable content extracting unit 1301, and an un-sendable content possession determining unit 1302. The un-sendable content extracting unit 1301 and the un-sendable content possession determining unit 1302 have similar functions to those of the un-sendable content extracting unit 542 and the un-sendable content possession determining unit 543 (FIG. 5) of the first embodiment, respectively.

The device separation notification sending process control unit 1300 controls the process of the whole device separation notification sending processing unit 130. In a case where the un-sendable content possession determining unit 1302 determines that there is any content that cannot be sent to the client devices, the device separation notification sending process control unit 1300 sends a request for disconnection of network connection to the communication process control unit 220 (FIG. 2), and also sends a request for multi-address transmission of a device separation notification to the device presence notification process control unit 221 (FIG. 2). At this request, the device presence notification process control unit 221 performs multi-address transmission of a notification that the server device 12 is separated from the network 10, which is addressed to all the client devices (client devices 13 and 14) that are connected to the network 10. In this way, the server device 12 gets separated from the network and gives a notification to that effect so as not to accept a content sending request from the client devices 13 and 14 thereafter.

As explained above, the communication apparatus according to the fifth embodiment can achieve the following effect in addition to the above-described effects (1), (2), (4), and (5).

(11) In the communication apparatus (server device 12) according to the present embodiment, the content list information retained by the open content information storage unit 232 indicates, for each content data candidate, a data communication band, which is a communication band required for transmitting the content data. The server device 12 includes the device separation notification sending processing unit 130 that prohibits sending of one or more of the content data candidates indicated in the content list information, based on the content list information and the remaining communication band information. This device separation notification sending processing unit 130 includes: the un-sendable content extracting unit 1301 that extracts any content data that has a data communication band equal to or greater than the remaining communication band, based on the content list information retained by the open content information storage unit 232 and the remaining communication band information calculated by the remaining communication band calculating unit 550; the un-sendable content possession determining unit 1302 that determines whether or not there is any content data that has a data communication band equal to or greater than the remaining communication band, based on any content data that is extracted by the un-sendable content extracting unit 1301; and separation notification means (device separation notification sending process control unit 1300) that, in a case where the un-sendable content possession determining unit 1302 determines that there is any content data that has a data communication band equal to or greater than the remaining communication band, disconnects the server device 12 from the network 10 and notifies the client devices 13 and 14 that the server device 12 is separated from the network 10. Hence, in a case where there is any content data that has a data communication band equal to or greater than the remaining communication band, all the content data are prohibited from being sent and thus communication disturbance attributable to a lack of the communication band will be suppressed.

In a case where the un-sendable content possession determining units 543, 904, and 1103 determine that there is any content data that cannot be sent at step S605 in FIG. 6, step S1005 in FIG. 10, and step S1205 in FIG. 12 in the first, third and fourth embodiments, the communication unit 21 may disconnect the connection to the network 10 and the device presence notification process control unit 221 may perform multi-address transmission to the network 10 of a device separation notification that the server device 12 is separated from the network 10.

Sixth Embodiment

Next, with references to FIG. 14 to FIG. 19, a sixth embodiment that embodies the communication apparatus according to the present invention will be explained. Here, points that make the present embodiment differ from the first embodiment described above will mainly be explained, and points that the present embodiment has in common with the first embodiment will not be explained.

Figure 14:
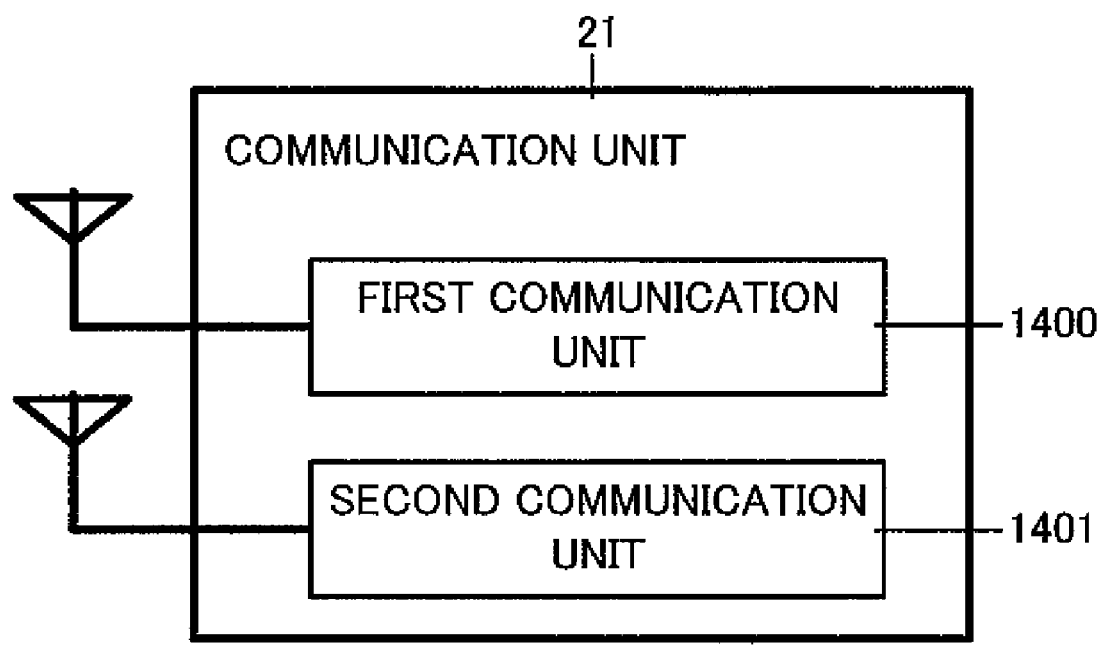
FIG. 14 is a block diagram about a sixth embodiment of the communication apparatus according to the present invention, showing a detailed configuration of a communication unit in the communication apparatus.

The communication unit 21 FIG. 2) of the communication apparatus (server device 12) according to the present embodiment has a configuration as shown in FIG. 14. That is, the communication unit 21 includes a first communication unit 1400 and a second communication unit 1401. A modem circuit and a communication protocol (wireless access means) that support an arbitrary wireless communication scheme (or a wireless communication standard) are implemented on each of the communication units 1400 and 1401. Hence, the server device 12 can use a plurality of wireless access means suitable to purposes, via these communication units 1400 and 1401. Note that any circuit and communication protocol that can be used in common between the first communication unit 1400 and the second communication unit 1401 may be provided in a manner to enable both of the communication units 1400 and 1401 to access them so that the both share them.

Figure 15:
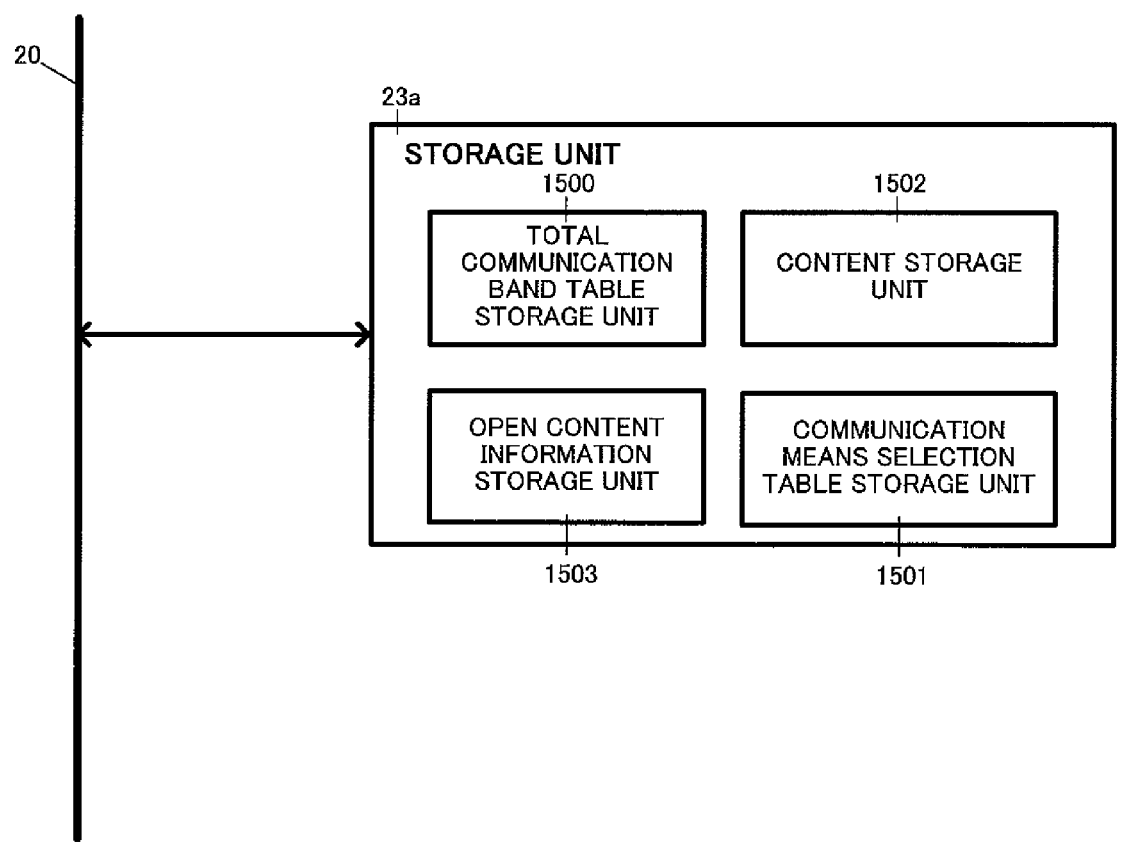
FIG. 15 is a block diagram showing a detailed configuration of a storage unit in the communication apparatus according to the sixth embodiment.

The communication apparatus (server device 12) according to the present embodiment includes a storage unit 23a as shown in FIG. 15, in place of the storage unit 23 (FIG. 2) of the first embodiment.

As shown in FIG. 15, the storage unit 23a includes a content storage unit 1502, an open content information storage unit 1503, a total communication band table storage unit 1500, and a communication means selection table storage unit 1501. Each of these units is constituted by a non-volatile memory medium likewise the storage unit 23 (FIG. 2). The content storage unit 1502 and the open content information storage unit 1503 have similar functions to those of the content storage unit 230 and the open content information storage unit 232 (FIG. 2) of the first embodiment, respectively.

The total communication band table storage unit 1500 is a memory area for storing the wireless access means installed on the communication unit 21, and a table (hereinafter referred to as total communication band table) that associates total communication band information with each wireless access means. The total communication band table storage unit 1500 stores a total communication band table as shown in, for example, FIGS. 16A and 16B.

To be more specific, the total communication band table shown in FIG. 16A includes such items as "index number (#)", "wireless access means", and "total communication band". "Index number" is assigned to each wireless access means installed on the communication unit 21 to identify what kind of wireless access means it is (the kind of the wireless access means). "Wireless access means" indicates the name (kind) of the wireless access means installed on the communication unit 21. "Total communication band" indicates total communication band information for each wireless access means. In the table shown in FIG. 16A, transfer rate information (see FIG. 3) is indicated as the total communication band information in "total communication band".

Meanwhile, the total communication band table shown in FIG. 16B includes items "index number (#)", "wireless access means", and "total communication band" likewise the table shown in FIG. 16A. However, in the table shown in FIG. 16B, transmission load (see FIG. 4A) is indicated as the total communication band information in "total communication band".

The communication means selection table storage unit 1501 is a memory area for storing communication applications (applications that involve communication) installed on the server device 12, and table information (hereinafter referred to as communication means selection table) that associates each communication application with wireless access means used in that application. The communication means selection table storage unit 1501 stores such a communication means selection table as shown in FIG. 17, for example.

As shown in FIG. 17, the communication means selection table includes such items as "index number (#)", "communication application", "wireless access means to be used (priority 1)", and "wireless access means to be used (priority 2)". "Index number (#)" is assigned to each communication application installed on the communication unit 21 to identify what kind of communication application it is (the kind of the communication application). "Communication application" indicates the name (kind) of the communication application installed on the server device 12. "Wireless access means to be used (priority 1)" indicates first wireless access means to be used, which is to be used for each "communication application" by priority over any other wireless access means installed on the communication unit 21. "Wireless access means to be used (priority 2)" indicates second wireless access means to be used, which is to be used in a case where the wireless access means indicated in "wireless access means to be used (priority 1)" cannot be used for some reason. The communication means selection table illustrated here associates a communication application with two or more, of plural kinds of access means, that are given priority orders. However, a table that associates a communication application with only any one of plural kinds of access means may be employed as a communication means selection table to be used for selection of communication means (access means).

Figure 18:
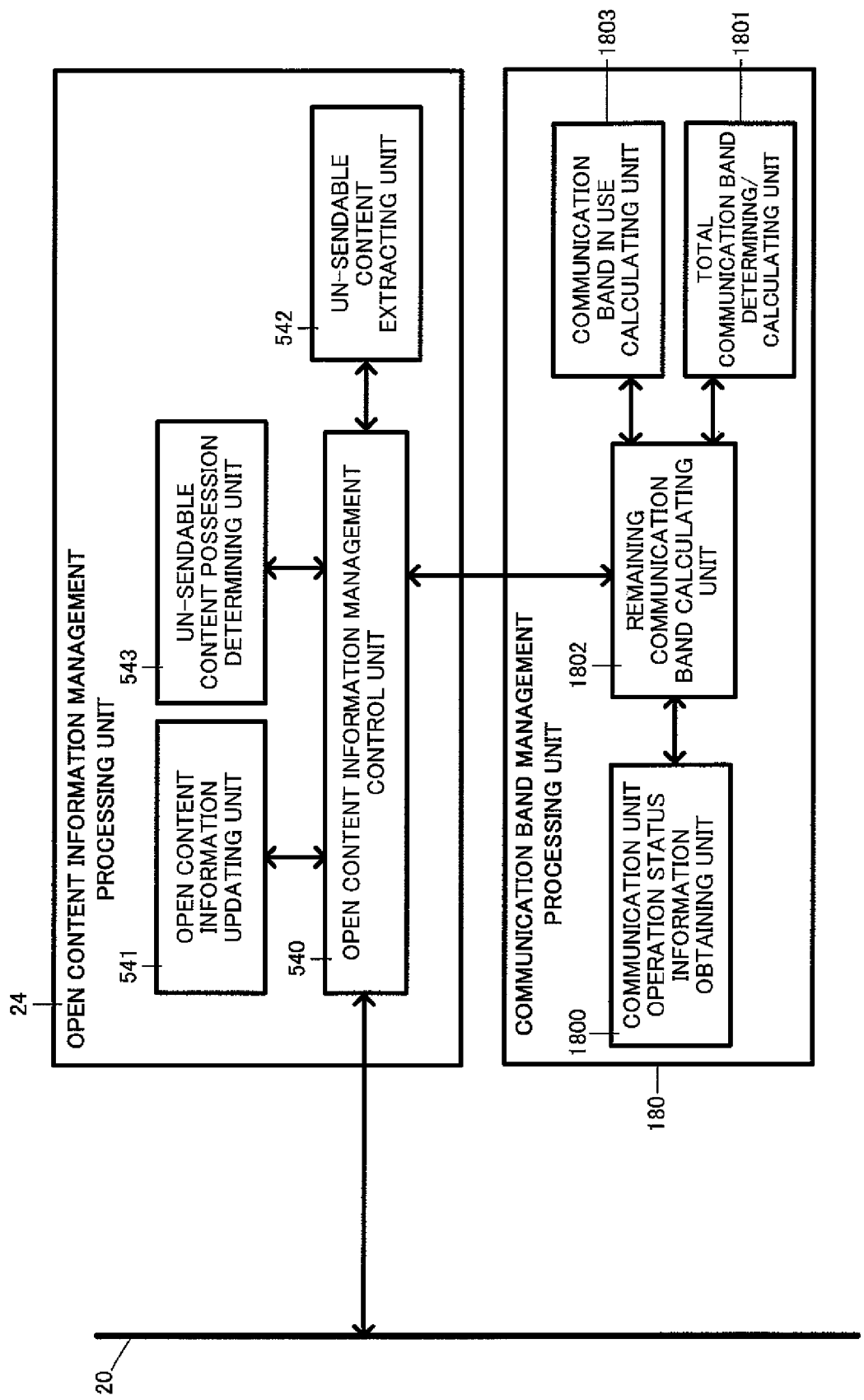
FIG. 18 is a block diagram showing detailed configurations of an open content information management processing unit and a communication band management processing unit in the communication apparatus according to the sixth embodiment.

Further, the communication apparatus (server device 12) according to the present embodiment includes a communication band management processing unit 180 as shown in FIG. 18, in place of the storage unit 23 (FIG. 2) of the first embodiment.

As shown in FIG. 18, the communication band management processing unit 180 includes a remaining communication band calculating unit 1802, a communication band in use calculating unit 1803, a communication unit operation status information obtaining unit 1800, and a total communication band determining/calculating unit 1801. The remaining communication band calculating unit 1802 and the communication band in use calculating unit 1803 have similar functions to those of the remaining communication band calculating unit 550 and the communication band in use calculating unit 552 (FIG. 5) of the first embodiment, respectively.

The communication unit operation status information obtaining unit 1800 obtains the operation status of each wireless access means installed on the communication unit 21 from the communication process control unit 220 (FIG. 2). The operation status of wireless access means may be, for example, "outside the service range", "idling", "now connecting", "access underway", etc., which are predetermined. The total communication band determining/calculating unit 1801 calculates total communication band information that can be used by the server device 12 to perform a communication such as sending of a content, etc., based on the operation status information of the wireless access means obtained by the communication unit operation status information obtaining unit 1800 and the total communication band table (FIGS. 16A and 16B) stored in the total communication band table storage unit 1500 (FIG. 15). In a case where a plurality of wireless access means can be used at the same time, the communication means selection table (FIG. 17) is referred to so that the wireless access means (corresponding to access means-to-be-used information) that should be used by the application concerned (here, a content exchange application) may be obtained.

Figure 19:
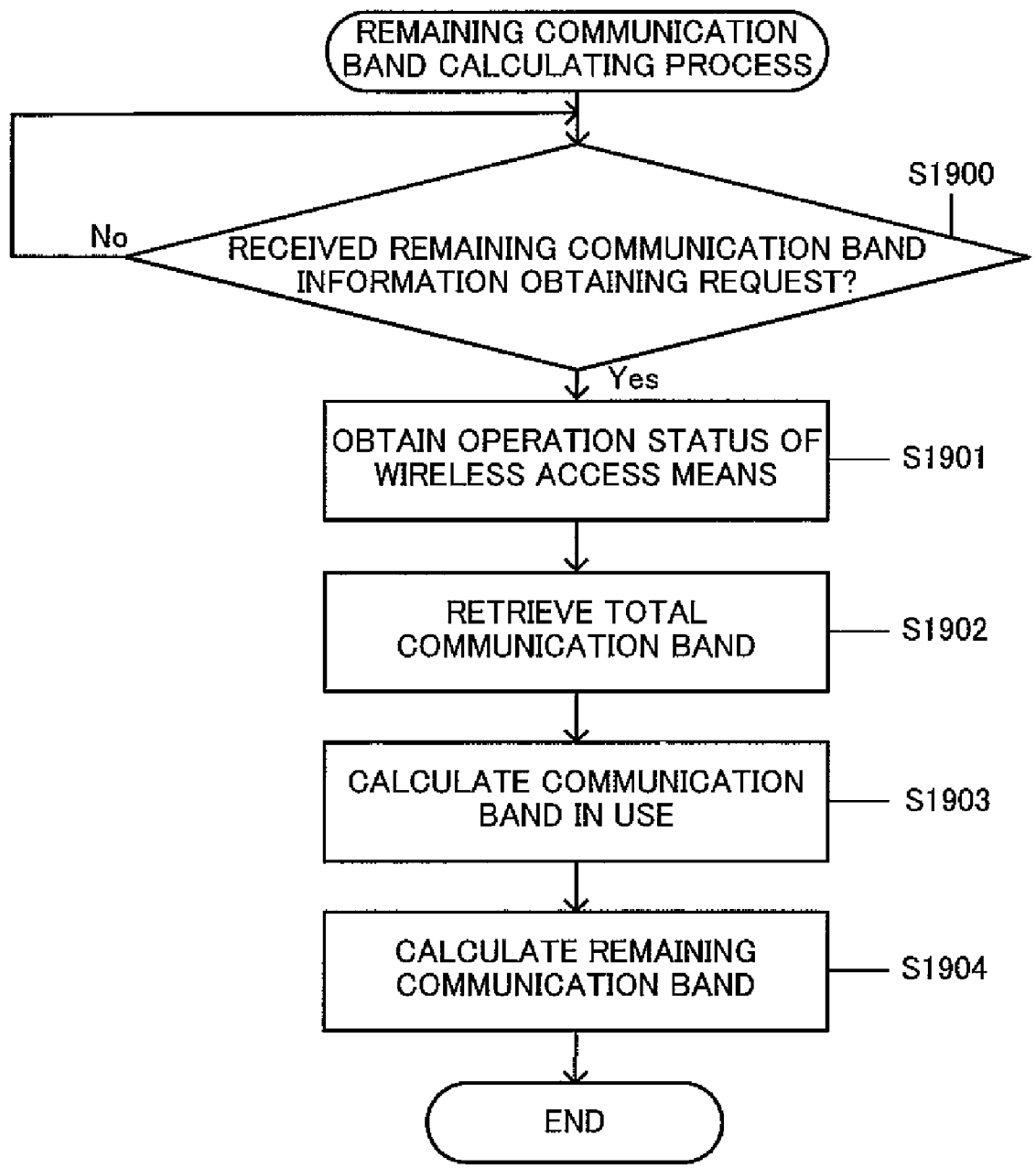
FIG. 19 is a flowchart showing a process procedure of content data sending control by the communication apparatus according to the sixth embodiment.

Next, an example of an operation of the communication apparatus (server device 12) according to the sixth embodiment having the above-described configuration for, as a communication terminal that supports a plurality of wireless access means, generating (updating) content list information stored in the open content information storage unit 232 and sending a response to a streaming-sending request for content data will be explained. That is, the server device 12 performs a process as shown in FIG. 19 for performing these processes. Specifically, the server device 12 starts the process of FIG. 19 when the power of the server device 12 is turned on, and repetitively performs the process of FIG. 19 by re-starting the process each time the process is completed.

In the process of FIG. 19, the remaining communication band calculating unit 1802 determines at step S1900 whether or not it has received from the open content information management processing unit 24 a notification to the effect that remaining communication band information is requested, and repetitively performs this reception determination at step S1900 until it determines that it has received such a notification.

When it is determined at step S1900 that such a notification is received (step S1900; Yes), the remaining communication band calculating unit 1802 sends at the next step S1901, a notification to the effect that operation status information of the communication unit 21 is requested, to the communication unit operation status information obtaining unit 1800. At this request, the communication unit operation status information obtaining unit 1800 obtains from the communication process control unit 220, the operation status (access means-to-be-used information) of each wireless access means installed on the communication unit 21, and notifies the operation status to the remaining communication band calculating unit 1802. In a case where a plurality of wireless access means can be used at the same time, the communication unit operation status information obtaining unit 1800 determines the wireless access means (access means to be used) that is to be used at that time based on the operation status information of each wireless access means and the communication means selection table (FIG. 17).

At the next step S1902, the remaining communication band calculating unit 1802 sends to the total communication band determining/calculating unit 1801, a request for total communication band information to be sent thereto. At this request, the total communication band determining/calculating unit 1801 obtains total communication band information (the sum of the total communication bands of the wireless access means that are determined at step S1901 as can be used) that can be used by the server device 12 to perform communication such as sending of a content, etc. based on the operation status information of each wireless access means obtained by the communication unit operation status information obtaining unit 1800 at step S1901 and the total communication band table (FIGS. 16A and 16B) stored in the total communication band table storage unit 1500, and notifies the total communication band information to the remaining communication band calculating unit 1802.

At the next step S1903, the communication band in use calculating unit 1803 calculates communication band in use information and notifies the communication band in use information to the remaining communication band calculating unit 1802.

At the next step S1904, the remaining communication band calculating unit 1802 calculates remaining communication band information that can be used by the server device 12, based on the total communication band information and the communication band in use information obtained at step S1902 and step S1903. Then, the remaining communication band calculating unit 1802 sends the calculated communication band information to the open content information management processing unit 24.

As explained above, the communication apparatus according to the sixth embodiment can achieve the following effects in addition to the above-described effects (1) to (5).

(12) The communication apparatus (server device 12) according to the present embodiment includes plural kinds of access means (the first communication unit 1400 and the second communication unit 1401), and access means-to-be-used information obtaining means (communication unit operation status information obtaining unit 1800) that obtains access means-to-be-used information that indicates access means to be used, which is access means, of the plural kinds of access means, that should be used at that time concerned (step S1902 in FIG. 19). The total communication band table storage unit 1500 (total communication band information storing means) retains total communication band information in association with access means of each kind (FIGS. 16A and 16B), and the remaining communication band calculating unit 1802 (remaining communication band calculating means) calculates remaining communication band information based on the total communication band information, of the pieces of total communication band information retained by the total communication band table storage unit 1500, that is associated with access means to be used, which is indicated by access means-to-be-used information obtained by the communication unit operation status information obtaining unit 1800 and based on communication band in use information calculated by the communication band in use calculating unit 1803. With this configuration, the remaining communication band calculating means in the server device 12 including plural kinds of access means can perform calculation with a higher accuracy, so that even as the radio wave condition changes successively, communication disturbance attributable to a lack of the communication band can suitably be suppressed and a fine communication environment can be maintained.

(13) The server device 12 includes access means associating means (communication means selection table storage unit 1501, FIG. 17) that associates those of the applications installed on the server device 12 that involve communication (communication applications) with two or more of the plural kinds of access means, to which priority orders are given. Hence, appropriate access means can be selected.

(14) The server device 12 includes usable access means information obtaining means (communication unit operation status information obtaining unit 1800) that obtains operation status information (usable access means information) of each wireless access means, which information indicates access means, of the plural kinds of access means, that can be used at the time concerned. Then, in the server device 12, the communication unit operation status information obtaining unit 1800 determines access means to be used, based on the usable access means information obtained by the communication unit operation status information obtaining unit 1800 and the communication means selection table storage unit 1501, i.e., obtains the access means-to-be-used information described above. Hence, access means that is appropriate as the access means to be used at the time concerned can be selected.

In the sixth embodiment described above, the communication unit 21, on which two communication units 1400 and 1401 are mounted, is shown as an example, but the present invention can likewise be applied to a case where three or more communication units are mounted. In such a case, it is preferable that the communication means selection table storage unit 1501 stores total communication band information for each of these wireless access means in the total communication band table. For example, in a case where the number of wireless access means is "n", it is preferable that "n" pieces of wireless access means-to-be-used information that are given priority orders be stored.

In the sixth embodiment described above, an example where the present invention is applied to the open content information management processing unit 24 is shown as an example. However, instead of the processing unit 24, any of the content sending determination control processing unit 70 (FIG. 7), the transcode or transrate control processing unit 90 (FIG. 9), the streaming mode information updating processing unit 110 (FIG. 11), and the device separation notification sending processing unit 130 (FIG. 13) may be employed. In such a case, a determination of from which of these processing units 70, 90, 110, and 130 a request for remaining communication band information is received is performed at step S1900 (FIG. 19) described above.

Other Embodiments

In each of the embodiments described above, content candidate information (content list information) is updated when sending of content data is started (while content data is sent). This is not the only case, but content candidate information may be updated after sending of content data is completed, e.g., when the remaining communication band increases. For example, the open content information management control unit 540 (or the transcode or transrate control unit 900, or the streaming mode flag information updating control unit 1100) may be configured as a unit (remaining communication band determining means) that determines whether the remaining communication band has changed (e.g., increased or decreased), and the remaining communication band calculating unit 550 may calculate remaining communication band information (or determine the remaining communication band) in a case where the open content information management control unit 540 (or the transcode or transrate control unit 900 or the streaming mode flag information updating control unit 1100) determines that the remaining communication band has changed. Even with such a configuration, an effect similar to the above-described effect (5) can be achieved.

The device separation notification sending process control unit 1300 may determine whether the remaining communication band has increased or not, so that when the remaining communication band increases, the server device that has been disconnected from the network may again be connected to the network and advertise via the device presence notification process control unit 221 that it is present on the network.

Figure 20A:
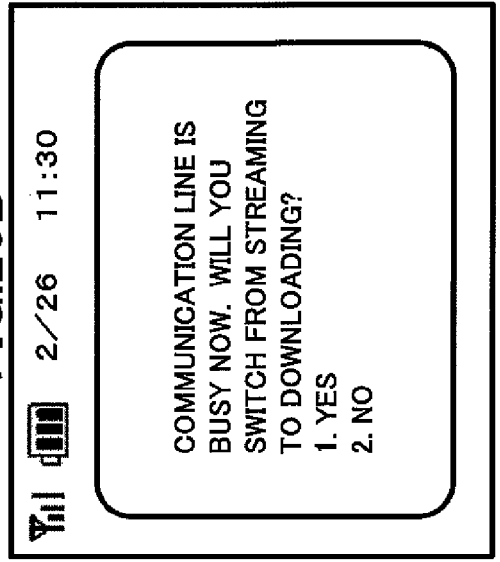
FIGS. 20A to 20D are diagrams about other embodiments of the communication apparatus according to the present invention, showing screens displayed on a display unit of a client device when it receives a response to its streaming-sending request for content data.
Figure 20B:
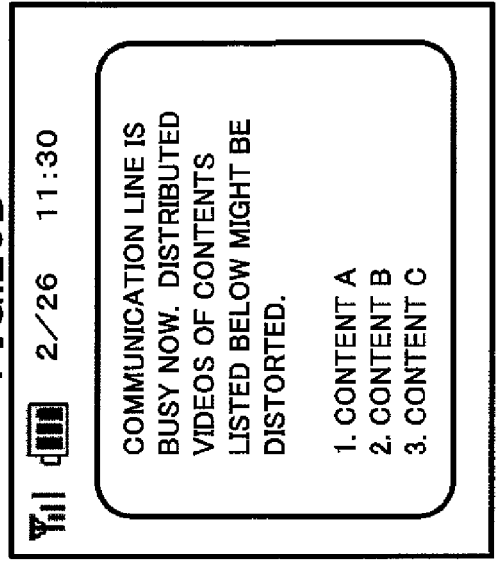
Figure 20C:
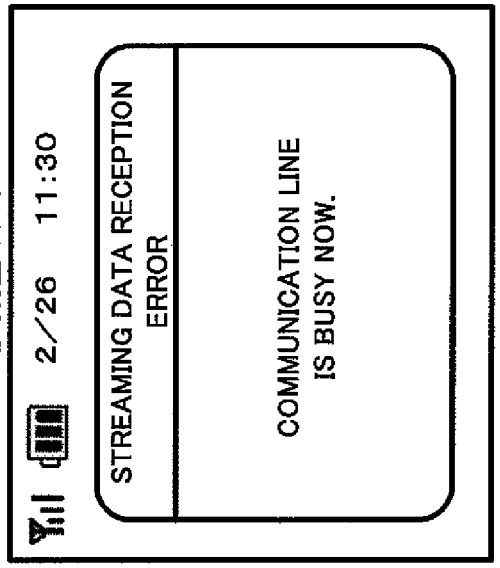
Figure 20D:
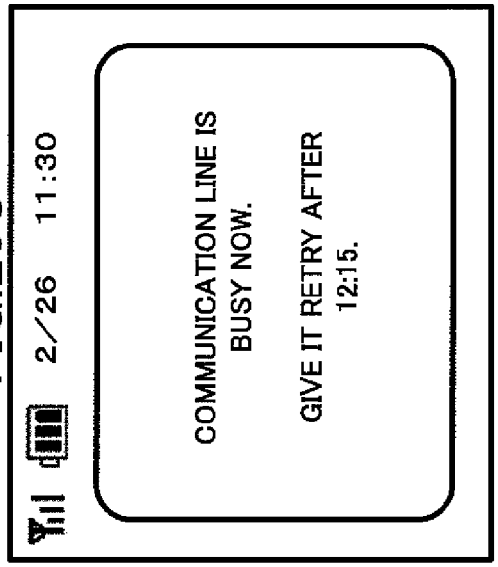

In each of the embodiments described above, in a case where the communication apparatus (server device 12) cannot perform streaming-sending, the server device 12 and the client devices 13 and 14 may exchange information for performing display using commands according to, for example, HTTP protocol or the like, so that a screen for, e.g., an "error display" as shown in FIG. 20A, an "operation (selection) screen" as shown in FIG. 20B, a "retry suggestion display" as shown in FIG. 20C, or a "status report" as shown in FIG. 20D may be output (displayed) on the display unit (e.g., a display device such as a CRT monitor) of the client devices.

The retry timing on the display screen of FIG. 20C is calculated by the following manner, for example. Here, for example, a case where the following (expression 0) is satisfied when any of the client devices 13 and 14 (requesting client) gives a streaming-sending request for a content C while the server device 12 is distributing two contents A and B will be explained.

$$\text{Transfer rate of content } C \geq \text{remaining communication band}_T \quad \text{(expression 0)}$$

Assuming that the times at which the distribution of the contents A and B is finished are EndTime A and EndTime B respectively and that both are in the relationship of "EndTimeA<EndTimeB", the remaining communication band when the distribution of the content A is finished can be expressed by a relational expression (expression 1).

$$\text{Remaining communication band}_{T+1} = \text{remaining communication band}_T + \text{transfer rate of content A} \quad \text{(expression 1)}$$

At this time, if a relational expression (expression 2), which is $$\text{Transfer rate of content } C \leq \text{remaining communication band}_{T+1} \quad \text{(expression 2)}$$

is satisfied, distribution of the content C becomes possible when the distribution of the content A is finished. Hence, the time "EndTime A" is displayed on the above display screen.

On the other hand, if (expression 2) is not satisfied, distribution of the content C is not possible when the distribution of the content A is finished, and will therefore be postponed until the distribution of the content B is finished. In this case, the remaining communication band when the distribution of the content B is finished can be expressed by a relational expression (expression 3).

$$\text{Remaining communication band}_{T+2} = \text{remaining communication band}_{T+1} + \text{transfer rate of content B} \quad \text{(expression 3)}.$$

At this time, if a relational expression (expression 4), which is $$\text{Transfer rate of content } C \geq \text{remaining communication band}_{T+2} \quad \text{(expression 4)}$$

is satisfied, distribution of the content C becomes possible when the distribution of the content B is finished. Hence, the time "EndTime B" is displayed on the above display screen. If (expression 4) is not satisfied either, the content C cannot originally be distributed. Hence, it is preferred that not the "retry suggestion display" as shown in FIG. 20C but an "error display" such as "this content cannot be distributed" be displayed.

In the "status report" screen shown in FIG. 20D, the list of contents that should be noted as "contents that cannot be distributed normally" can be displayed by, for example, the server device 12 sending the information extracted by the un-sendable content extracting unit 542 (FIG. 5, etc.) to the client device (requesting client).

By performing such displays (FIGS. 20A to 20D), it is possible not to make a user, who is familiar with the list of contents stored in the server device 12, feel discomfort for not being able to receive streaming data.

In each of the embodiments described above, it has been described that the server device 12 and the client devices 13 and 14 communicate with each other wirelessly, but they may be configured to communicate via wired connection. In such a case, wired access means via an x Digital Subscriber Line (xDSL), a fiber optic, etc. (standard for wired connection) may be used.

In each of the embodiments described above, any content data that has a data communication band equal to or greater than the remaining communication band is prohibited from sending or subjected to data processing. However, this is not the only case. For example, even such content data that is smaller than the remaining communication band but close to the remaining communication band may be prohibited from sending or subjected to data processing (transcoding) in the manner described above. For example, a predetermined margin band may be set, and any content data that does not satisfy "data communication band+margin band<remaining communication band" may be prohibited from sending or subjected to data processing in the manner described above.

The communication unit 21 that performs communication according to a plurality of communication protocols has been shown as plural kinds of wireless access means. However, communication means that employ different communication schemes to each other, such as communication units that use different frequency bands to each other, or communication units that communicate with a portable base station and with a wireless LAN base station respectively, may be employed as wireless access means that are different from each other. The communication unit may physically be constituted by a plurality of communication units.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-94341 filed on Mar. 31, 2008 and including specification, claims, drawings and summary. The disclosure of the above Japanese Patent Application is incorporated herein by reference in its entirety.

What is claimed is:

1. A communication apparatus that sends content data to another communication apparatus via a network, comprising:
a memory; and
a processor configured to execute instructions stored in the memory, the instructions causing:
a content candidate information storage to retain content candidate information that specifies content data candidates that may be sent by the communication apparatus to said another communication apparatus;
a remaining communication band information obtainer to obtain remaining communication band information that indicates a communication band of a total communication band available for use by the communication apparatus that can be used at a time concerned;
a content sender to send any content data specified in the content candidate information to said another communication apparatus;
a communication controller to control sending of said content data by the content sender based on the content candidate information retained by the content candidate information storage and the remaining communication band information obtained by the remaining communication band information obtainer;
an un-sendable content extractor to extract any content data that requires, for the content data to be sent, a communication band equal to or greater than a remaining communication band based on the remaining communication band information obtained by the remaining communication band information obtainer and the content candidate information retained by the content candidate information storage;
a data processor that includes a transcoder to transcode content data extracted by the un-sendable content extractor which require a communication band equal to or greater than the remaining communication band for the content data to be sent such that the transcoded data require a communication band equal to or smaller than the remaining communication band;
a remaining communication band determiner to determine whether or not the remaining communication band has changed,
wherein the content candidate information retained by the content candidate information storage includes, for each content data candidate, information that indicates a communication band required for sending the corresponding content data;
a total communication band information storage to retain total communication band information that indicates a total communication band available for use by the communication apparatus to perform communication; and
a communication band in use obtainer to obtain communication band in use information that indicates a communication band, of the total communication band, that is used at the time concerned for performing sending, based on the content candidate information retained by the content candidate information storage and additional information indicating communication statuses of applications for data other than the content data specified in the content candidate information, and
the remaining communication band information obtainer to obtain the remaining communication band information based on the total communication band information retained by the total communication band information storage and the communication band in use information obtained by the communication band in use obtainer.

2. The communication apparatus according to claim 1, wherein the instructions cause the communication controller to prohibit sending of one or more of the content data indicated in the content candidate information based on the content candidate information retained by the content candidate information storage and the remaining communication band information obtained by the remaining communication band information obtainer.

3. The communication apparatus according to claim 2, wherein the communication apparatus includes a content candidate updater, and the instructions cause the content candidate updater to prohibit sending of the content data extracted by the un-sendable content extractor by excluding the content candidate information that corresponds to the content data from the content candidate information retained by the content candidate information storage.

4. The communication apparatus according to claim 1, wherein the communication apparatus includes a content candidate information updater, and the instructions cause the content candidate information updater to exclude, after the transcoding by the data processor, the content candidate information corresponding to the content data that requires a communication band equal to or greater than the remaining communication band for the content data to be sent from the content candidate information retained by the content candidate information storage, and stores content candidate information corresponding to the transcoded content data in the content candidate information storage.

5. The communication apparatus according to claim 1, wherein if the remaining communication band determiner determines that the remaining communication band has changed, the remaining communication band information obtainer updates the remaining communication band information.

6. A communication method that sends content data from a communication apparatus to another communication apparatus via a network, comprising:
storing content candidate information, at the communication apparatus, that specifies content data candidates that may be sent to said another communication apparatus;
obtaining a remaining communication band information that indicates a communication band, of a total communication band that is available for sending contents, that can be used at a time concerned;
controlling sending of said content data based on the content candidate information and the remaining communication band information;

extracting any content data that requires, for the content data to be sent, a communication band equal to or greater than a remaining communication band based on the remaining communication band information and the content candidate information;

transcoding the extracted content data requiring a communication band equal to or greater than the remaining communication band for the content data to be sent such that the transcoded data require a communication band equal to or smaller than the remaining communication band; and determining whether or not the remaining communication band has changed, wherein the stored content candidate information includes, for each content data candidate, information that indicates a communication band required for sending the corresponding content data;

storing total communication band information that indicates a total communication band available for use by the communication apparatus to perform communication; and obtaining communication band in use information that indicates a communication band, of the total communication band, that is used at the time concerned for performing sending, based on the stored content candidate information and additional information indicating communication statuses of applications for data other than the content data specified in the content candidate information, and wherein the remaining communication band information is obtained based on the total communication band information and the communication band in use information.

7. A non-transitory computer readable recording medium that stores a program for controlling a computer to function in a communication apparatus that sends content data to another communication apparatus via a network, the program causing:

a content candidate information storage to retain content candidate information that specifies content data candidates that may be sent by the communication apparatus to said another communication apparatus;

a remaining communication band information obtainer to obtain remaining communication band information that indicates a communication band of a total communication band available for use by the communication apparatus that can be used at a time concerned;

a content sender to send any content data specified in the content candidate information to said another communication apparatus;

a communication controller to control sending of said content data by the content sender based on the content candidate information retained by the content candidate information storage and the remaining communication band information obtained by the remaining communication band information obtainer;

an un-sendable content extractor to extract any content data that requires, for the content data to be sent, a communication band equal to or greater than a remaining communication band based on the remaining communication band information obtained by the remaining communication band information obtainer and the content candidate information retained by the content candidate information storage;

a data processor that includes a transcoder to transcode content data extracted by the un-sendable content extractor which require a communication band equal to or greater than the remaining communication band for the content data to be sent such that the transcoded data require a communication band equal to or smaller than the remaining communication band; and a remaining communication band determiner to determine whether or not the remaining communication band has changed, wherein the content candidate information retained by the content candidate information storage includes, for each content data candidate, information that indicates a communication band required for sending the corresponding content data;

a total communication band information storage to retain total communication band information that indicates a total communication band available for use by the communication apparatus to perform communication; and a communication band in use obtainer to obtain communication band in use information that indicates a communication band, of the total communication band, that is used at the time concerned for performing sending, based on the content candidate information retained by the content candidate information storage and additional information indicating communication statuses of applications for data other than the content data specified in the content candidate information, and the remaining communication band information obtainer to obtain the remaining communication band information based on the total communication band information retained by the total communication band information storage and the communication band in use information obtained by the communication band in use obtainer.

* * * * *